US009021104B2

(12) United States Patent
Chan et al.

(10) Patent No.: US 9,021,104 B2
(45) Date of Patent: Apr. 28, 2015

(54) SYSTEM AND METHOD FOR MOBILITY MANAGEMENT IN A WIRELESS COMMUNICATIONS SYSTEM

(75) Inventors: Hinghung Anthony Chan, Plano, TX (US); Muhana Magboul Ali Muslam, Khartoum (SD)

(73) Assignee: Futurewei Technologies, Inc., Plano, TX (US)

( * ) Notice: Subject to any disclaimer, the term of this patent is extended or adjusted under 35 U.S.C. 154(b) by 1051 days.

(21) Appl. No.: 13/084,956

(22) Filed: Apr. 12, 2011

(65) Prior Publication Data
US 2012/0221698 A1 Aug. 30, 2012

Related U.S. Application Data

(60) Provisional application No. 61/447,409, filed on Feb. 28, 2011.

(51) Int. Cl.
G06F 15/16 (2006.01)
H04W 8/06 (2009.01)
H04W 36/14 (2009.01)
H04L 29/12 (2006.01)

(52) U.S. Cl.
CPC .............. *H04W 8/065* (2013.01); *H04W 36/14* (2013.01); *H04L 61/103* (2013.01); *H04L 61/2084* (2013.01)

(58) Field of Classification Search
CPC ............... H04W 80/04; H04W 88/182; H04L 29/12018; H04L 61/10; H04L 29/12028; H04L 63/0281; H04L 61/00
See application file for complete search history.

(56) References Cited

U.S. PATENT DOCUMENTS

| 7,620,958 | B2* | 11/2009 | Carrell et al. ................. 719/319 |
| 2007/0204150 | A1 | 8/2007 | Jokela et al. |
| 2007/0274312 | A1 | 11/2007 | Salmela et al. |
| 2008/0271132 | A1* | 10/2008 | Jokela et al. ..................... 726/10 |
| 2010/0177698 | A1 | 7/2010 | Salmela et al. |
| 2010/0284400 | A1* | 11/2010 | Melen et al. .................. 370/389 |
| 2010/0313024 | A1* | 12/2010 | Weniger et al. ............... 713/170 |
| 2011/0035585 | A1* | 2/2011 | Haddad ......................... 713/162 |

FOREIGN PATENT DOCUMENTS

| CN | 1938999 A | 3/2007 |
| CN | 1939000 A | 3/2007 |
| WO | 2005081466 A1 | 9/2005 |

(Continued)

OTHER PUBLICATIONS

Melen et al., "Host Identity Protocol-Based Mobile Proxy," Internet Draft, http://tools.ietf.org/id/draft-melem-hip-proxy-02.txt, Aug. 20, 2009, 13 pages.

(Continued)

*Primary Examiner* — Peling Shaw
(74) *Attorney, Agent, or Firm* — Slater & Matsil, LLP

(57) ABSTRACT

A system and method for mobility management in a wireless communications system are provided. A method for proxy server operations includes determining if a communications device is capable of performing an operation, forwarding a transmission to a destination of the transmission if the communications device is capable of performing an operation, and responding to the transmission on behalf of the communications device if the communications device is not capable of performing an operation.

33 Claims, 20 Drawing Sheets

(56) References Cited

FOREIGN PATENT DOCUMENTS

WO 2005101753 A1 10/2005
WO WO 2008-151672 A1 12/2008

OTHER PUBLICATIONS

Moskowitz et al., "Host Identity Protocol," Request for Comments: 5201, http://tools.ietf.org/html/rfc4423, Apr. 2008, 104 pages.

Nikander et al., "End-Host Mobility and Multihoming with the Host Identity Protocol," Request for Comments: 5206, http://tools.ietf.org/html/rfc5206, Apr. 2008, 41 pages.

Novaczki et al., "Micromobility Support in HIP," IEEE MELECON 2006, Benalmadena (Malaga), Spain, May 16-19, 2006, pp. 651-654.

Extended European Search Report, Application No. 11786037.9, Applicant Huawei Technologies Co., Ltd., dated Jan. 17, 2014, 10 pages.

International Search Report of Patent Cooperation Treaty, International Application No. PCT/CN2011/074093, Applicant Huawei Technologies Co., Ltd., et al., date of mailing Dec. 8, 2011, 5 pages.

* cited by examiner

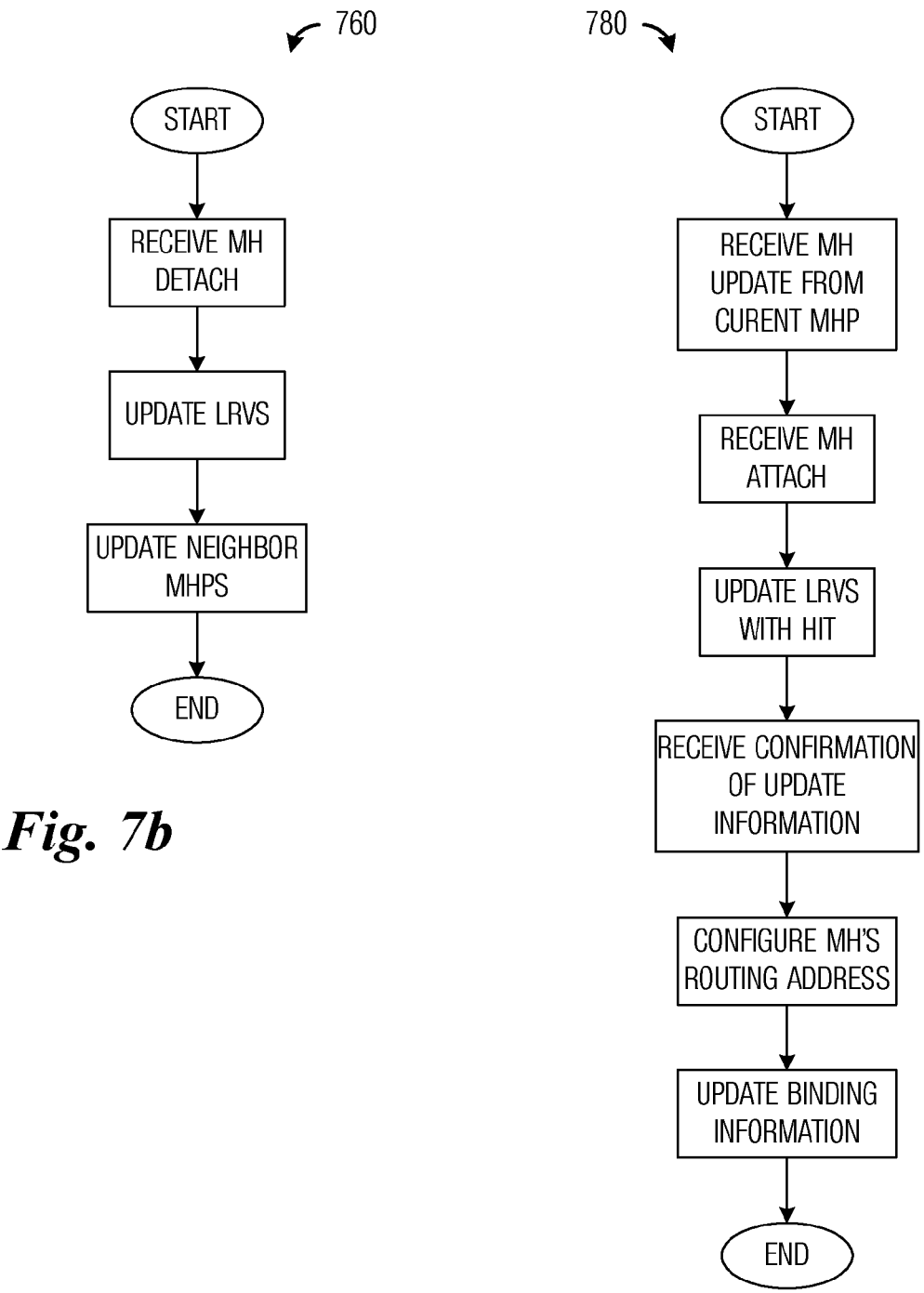

SYSTEM AND METHOD FOR MOBILITY MANAGEMENT IN A WIRELESS COMMUNICATIONS SYSTEM

This application claims the benefit of U.S. Provisional Application No. 61/447,409, filed on Feb. 28, 2011, entitled "System and Method for Mobility Management in a Wireless Communications System," which application is hereby incorporated herein by reference.

TECHNICAL FIELD

The present invention relates generally to digital communications, and more particularly to a system and method for mobility management in a wireless communications system.

BACKGROUND

Wireless communications systems have changed the way that their users work and enjoy information access. No longer are users of wireless broadband access systems restricted to specific locations with wireline access to information services. In fact, users are free to move wherever they like within a coverage area and still have rapid access to information that they need and/or desire.

Currently available wireless communications system utilize a single identifier, usually an Internet Protocol (IP) address, to identify a communications device as well as to address (route information to and from) the communications device. The use of a single identifier may complicate device mobility since as the communications device moves about, it may be necessary to handover the communications device from a first access network to a second access network, thereby potentially resulting in a different identifier. The use of the different identifier may complicate locating the communications device.

A variety of newly proposed protocols, such as Host Identity Protocol (HIP) defined by the Internet Engineering Task Force (IETF), separate the single identifier into two identifiers, with a host identifier (e.g., a host identity) to be used for network session identification, and an IP address for addressing purposes. In addition to simplifying locating a communications device, the use of two identifiers may also provide better security support, as well as a framework with which a mechanism for mobility management may be designed.

However, supporting the dual identifier protocols, such as HIP, may require modifications to the IP protocol stack at hosts (also commonly referred to as communications devices, mobiles, mobile stations, terminals, users, subscribers, and so on). Requiring upgrades to hosts may be an expensive (if not impossible) proposition. A HIP proxy (or equivalently, a HIP proxy server) provides HIP function including security features by the network without requiring modifications to the host, yet it is still necessary to design the appropriate mobility management mechanisms that will improve the handover performance.

Additionally, existing mobility support mechanisms with the dual identifier protocols, such as HIP, suffer from long handover delay due to signaling overhead, such as duplicate address detection (DAD), location update, security signaling, and so forth.

Therefore, there is a need for a system and method for providing mobility management in a wireless communications system without requiring upgrades to hosts, i.e., provides support for legacy hosts.

SUMMARY OF THE INVENTION

These and other problems are generally solved or circumvented, and technical advantages are generally achieved, by example embodiments of the present invention which provide a system and method for mobility management in a wireless communications system.

In accordance with an example embodiment of the present invention, a method for proxy server operations is provided. The method includes determining if a communications device is capable of performing an operation, forwarding a transmission to a destination of the transmission if the communications device is capable of performing an operation, and responding to the transmission on behalf of the communications device if the communications device is not capable of performing an operation.

In accordance with an example embodiment of the present invention, a proxy server is provided. The proxy server includes a host determining unit, a forwarding unit coupled to the host determining unit, and a response unit coupled to the host determining unit. The host determining unit determines if a communications device is capable of performing an operation, the forwarding unit forwards a transmission to a destination of the transmission if communications device is capable of performing an operation, and the response unit responds to the transmission on behalf of the communications device if the communications device is not capable of performing an operation.

In accordance with an example embodiment of the present invention, a method for proxy server operations is provided. The method includes determining that a communications device is attaching to a communications system, updating binding information for the communications device at a server, and configuring an addressing identifier for the communications device. The binding information includes an identifier for the communications device.

In accordance with an example embodiment of the present invention, a proxy server is provided. The proxy server includes a packet processing unit, a binding information managing unit coupled to the packet processing unit, and an addressing unit coupled to the packet processing unit. The packet processing unit determines if a communications device is attaching to a communications system, the binding information managing unit manages changes in the binding information, and the addressing unit configures an addressing identifier for the communications device.

In accordance with an example embodiment of the present invention, a method for proxy server operations is provided. The method includes determining that a communications device is detaching from a communications system, updating binding information for the communications device at a server, and providing binding information for the communications device to neighboring proxies.

One advantage disclosed herein is that only a small number of high level network components require upgrading to provide support for legacy hosts. Therefore, implementation costs and complexity may be kept to a minimum. As an example, existing hosts (i.e., legacy hosts) already installed in a communications system will continue to be supported as a migration to HIP enabled hosts occur. Therefore, existing equipment do not need to be immediately replaced.

A further advantage of exemplary embodiments is that a hierarchical binding information structure is utilized to help reduce lookup overhead, handover overhead, and so forth.

A further advantage of exemplary embodiments is that it is possible to co-locate the mobility management function only at the access router. It will then achieve all the benefits of this disclosure but for HIP host only, not non-HIP host.

The foregoing has outlined rather broadly the features and technical advantages of the present invention in order that the detailed description of the embodiments that follow may be better understood. Additional features and advantages of the embodiments will be described hereinafter which form the subject of the claims of the invention. It should be appreciated by those skilled in the art that the conception and specific embodiments disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawing, in which:

FIG. 7b illustrates an example flow diagram of current MHP operations 760 as a non-HIP enabled MH handovers from a current access network and a new access network with both access networks belonging to a single domain managed by a single LRVS according to example embodiments described herein;

FIG. 7c illustrates an example flow diagram of new MHP operations 780 as a non-HIP enabled MH handovers from a current access network and a new access network with both access networks belonging to a single domain managed by a single LRVS according to example embodiments described herein;

DETAILED DESCRIPTION OF ILLUSTRATIVE EMBODIMENTS

The making and using of the current example embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

The present invention will be described with respect to example embodiments in a specific context, namely a wireless communications system that utilizes HIP to provide mobility and security for hosts attached to the wireless communications system. The invention may also be applied, however, to other wireless communications systems that make of protocols that make use of separate identifiers for identification and routing, such as Identity Locator Network Protocol for IPv6 (ILNPv6), Shim6, Host Identity Indirection Infrastructure (Hi3), Internet Indirection Infrastructure (i3), and so forth.

Figures 1A, 1B:
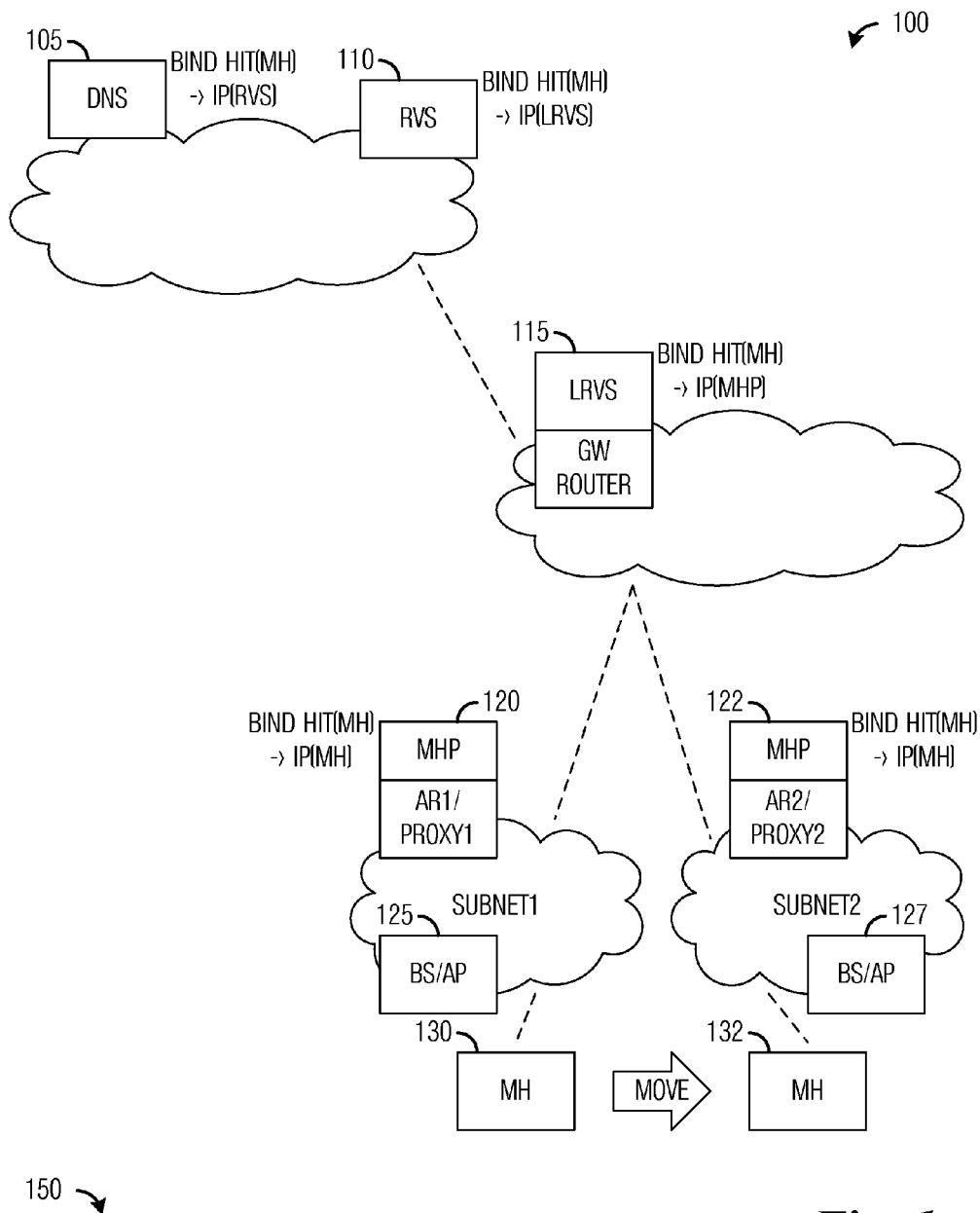
FIG. 1a illustrates an example wireless communications system according to example embodiments described herein.
FIG. 1b illustrates a table 150 of binding information for a MH

FIG. 1a illustrates a wireless communications system 100. Wireless communications system 100 makes use of HIP or some other protocol that supports dual identifiers for identification and routing purposes, and includes a domain name server (DNS) 105 that provides identification and routing identifiers for communications devices operating in wireless communications system 100 based on name requests.

Wireless communications system 100 also includes a rendezvous server (RVS) 110, which operates in conjunction with DNS 105 to provide reachability of a host (HIP enabled and/or non-HIP enabled) by maintaining mappings between an identifier for the host (referred to as a host identification tag (HIT) in HIP) as well as an IP address for the host. In a wireless communications system utilizing HIP, such as wireless communications system 100, a host may be referred to as a mobile host (MH). Any other host which may or may not be in wireless communication system 100 and which is communicating with the MH is referred to as a correspondent host (CH). The CH may or may not be mobile. A communication session takes place between a MH and a CH. Yet if CH is also mobile, it is then both a MH and a CH.

Wireless communications system 100 also includes a local rendezvous server (LRVS) 115, which may perform RVS functionality at a local level, such as in a domain. LRVS 115 may also perform Network Address Translation (NAT) within a given domain. As shown in FIG. 1a, LRVS 115 may be co-located with a gateway router (GW). Wireless communications system 100 may include a plurality of LRVSs, generally with a LRVS per domain in wireless communications system 100.

At a level lower than LRVS 115 there may be a number of subnets, with each subnet containing a Mobility-HIP-Proxy (or Proxy server) (MHP), such as MHP 120 for a first subnet and MHP 122 for a second subnet. As shown in FIG. 1a, a MHP may be co-located with an access router (AR)/proxy server. A MHP may perform RVS functionality at a subnet level.

Within a single subnet, there may be a number of Base Stations (BS) and/or Access Points (AP), such as BS/AP 125 for the first subnet and BS/AP 127 for the second subnet. A BS/AP may serve as a communications controller for mobile hosts, such as MH, attached to the BS/AP. As shown in FIG. 1a, BS/AP 125 is serving MH 130. However, since MH 130 may be a mobile communications device, MH 130 may move to an area where coverage of BS/AP 125 is poor and may handover to BS/AP 127. MH 130 is shown as MH 132 in FIG. 1a when it is served by BS/AP 125.

According to an example embodiment, network-based mobility management function is integrated with proxy HIP functions at a MHP to support all hosts (HIP enabled and non-HIP enabled). The hosts are not required to possess new functions including network management and HIP capability other than the existing IP protocol stack. Yet the hosts may be able to achieve multi-homing capability and the security level native to a wireless communications system using HIP in addition to receiving network-based mobility support.

According to an example embodiment, additional mobility management functions at the access routers taking advantage of the proxy HIP capability. These additional functions are network-based and include mobile hosts tracking, location update, security signaling, assigning of network prefix per host identifier, and using the same network prefix within the same network domain to avoid duplicate address detection (DAD), resulting in improved handover performance. It also enables a mobile host, irrespective of whether it is or is not HIP enabled, to use the same IP address as long as its points of attachments are within the same domain.

According to an example embodiment, a MHP (such as MHP 120 or MHP 122) may perform HIP signaling on behalf of a non-HIP enabled MH so that HIP services may be offered to non-HIP compliant MHs.

According to an example embodiment, a MHP may track movement of a MH.

According to an example embodiment, a MHP may update a MH's binding record. After detection of an attachment of a MH, a MHP may send an update message to a nearest anchor point (e.g., a LRVS or RVS) that is a cross-over point between the MH's old point of attachment and the MH's new point of attachment.

FIG. 1b illustrates a table 150 of binding information for a MH. According to an example embodiment, the binding information presented in table 150 may be managed in a hierarchical fashion in a DNS, a RVS, a LRVS, and a MHP. The hierarchical arrangement of the binding information may enable the reachability of the MH which may be registered with the MHP.

Once the MH becomes registered, the MHP holds binding information of the HIT of the MH (e.g., HIT(MH)) to the IP address of the MH (e.g., IP(MH)). While the LRVS holds binding information of the HIT of the MH (i.e., HIT(MH)) to the IP address of the MHP (e.g., IP(MHP)), and the RVS holds binding information of the HIT of the MH (i.e., HIT (MH)) to the IP address of the LRVS (e.g., IP(LRVS)), and the DNS holds binding information of the HIT of the MH (i.e., HIT(MH)) to the IP address of the RVS (e.g., IP(RVS)). The binding information held at the various levels of the hierarchy is shown graphically in FIG. 1a.

Figures 2A, 2B:
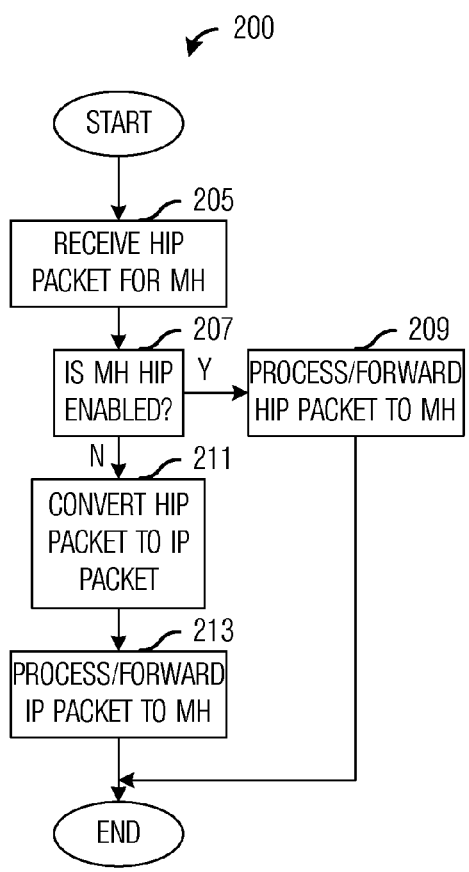
FIG. 2a illustrates an example flow diagram of MHP operations 200 as a MHP receives a packet for a MH according to example embodiments described herein.
FIG. 2b illustrates a flow diagram of MHP operations 250 as a MHP receives a packet from a MH

FIG. 2a illustrates a flow diagram of MHP operations 200 as a MHP receives a packet for a MH. Operations 200 may be indicative of high-level operations occurring in a MHP, such as MHP 120 and MHP 122, as the MHP receives a packet intended for a MH, such as MH 130 and MH 132. Operations 200 may occur while the MHP is in a normal operating mode and has MHs attached or registered.

Operations 200 may begin with the MHP receiving a HIP packet intended (addressed) to the MH (block 205). The MHP may then perform a check to determine if the MH is a HIP enabled MH (block 207). According to an example embodiment, the determination may be according to how the MH attaches and registers with the network. A non-HIP host attaches to the network using IP packets without performing HIP registration, whereas a HIP host uses HIP packets and performs HIP registration. According to an example embodiment, if the MH is a HIP enabled MH, then the packet intended for the MH is a HIP packet, while if the MH is a non-HIP enabled MH, then the packet intended for the MH is an IP packet. According to an example embodiment, the MHP knows the capabilities (e.g., HIP enabled or non-HIP enabled) of the MH when the MH attaches to the MHP. In general, the MHP may determine if the MH is capable of performing an operation or a set of operations.

If the MH is HIP enabled, then the MH is capable of processing the HIP packet and the MHP may process and/or forward the packet to the MH (block 209). However, if the MH is non-HIP enabled, then the MH is incapable of processing the packet and the MHP may convert the HIP packet to an IP packet or some other protocol packet (block 211) and then process and/or forward the packet to the MH (block 213). In general, process and/or forward may be collectively described as responding to the packet.

Furthermore, if the MH is HIP enabled, the MHP may provide mobility function support, which may help to make handovers, attachment, detachment, and so forth, more reliable and/or more efficient. If the MH is not HIP enabled, then the MHP may not be able to provide mobility function support.

Although the flow diagram shown in FIG. 2a (and in other figures shown herein) illustrate support for both HIP enabled and non-HIP enabled MHs, alternatives of the flow diagram(s) exist wherein support for only HIP enabled MHs or non-HIP enabled MHs is provided. Therefore, illustration and discussion of support for both HIP enabled and non-HIP enabled MHs should not be construed as being limiting to either the scope or the spirit of the example embodiments.

FIG. 2b illustrates a flow diagram of MHP operations 250 as a MHP receives a packet from a MH. Operations 250 may be indicative of high-level operations occurring in a MHP, such as MHP 120 and MHP 122, as the MHP receives a packet from a MH, such as MH 130 and MH 132. Operations 250 may occur while the MHP is in a normal operating mode and has MHs attached or registered.

Operations 250 may begin with the MHP receiving a packet from the MH (block 255). The MHP may then perform a check to determine if the MH is a HIP enabled MH (block 257). According to an example embodiment, if the MH is a HIP enabled MH, then the packet intended for the MH is a HIP packet, while if the MH is a non-HIP enabled MH, then the packet intended for the MH is an IP packet. According to an example embodiment, the MHP knows the capabilities (e.g., HIP enabled or non-HIP enabled) of the MH when the MH attaches to the MHP. In general, the MHP may determine if the MH is capable of performing an operation or a set of operations.

If the MH is HIP enabled, then the packet is a HIP packet and may be processed and/or forwarded as needed (block 259). However, if the MH is non-HIP enabled, then the packet is an IP packet (or some other protocol) and the MHP may convert the HIP packet to an IP packet (block 261) and then process and/or forward the packet as needed (block 263). In general, process and/or forward may be collectively described as responding to the packet.

Figure 3:
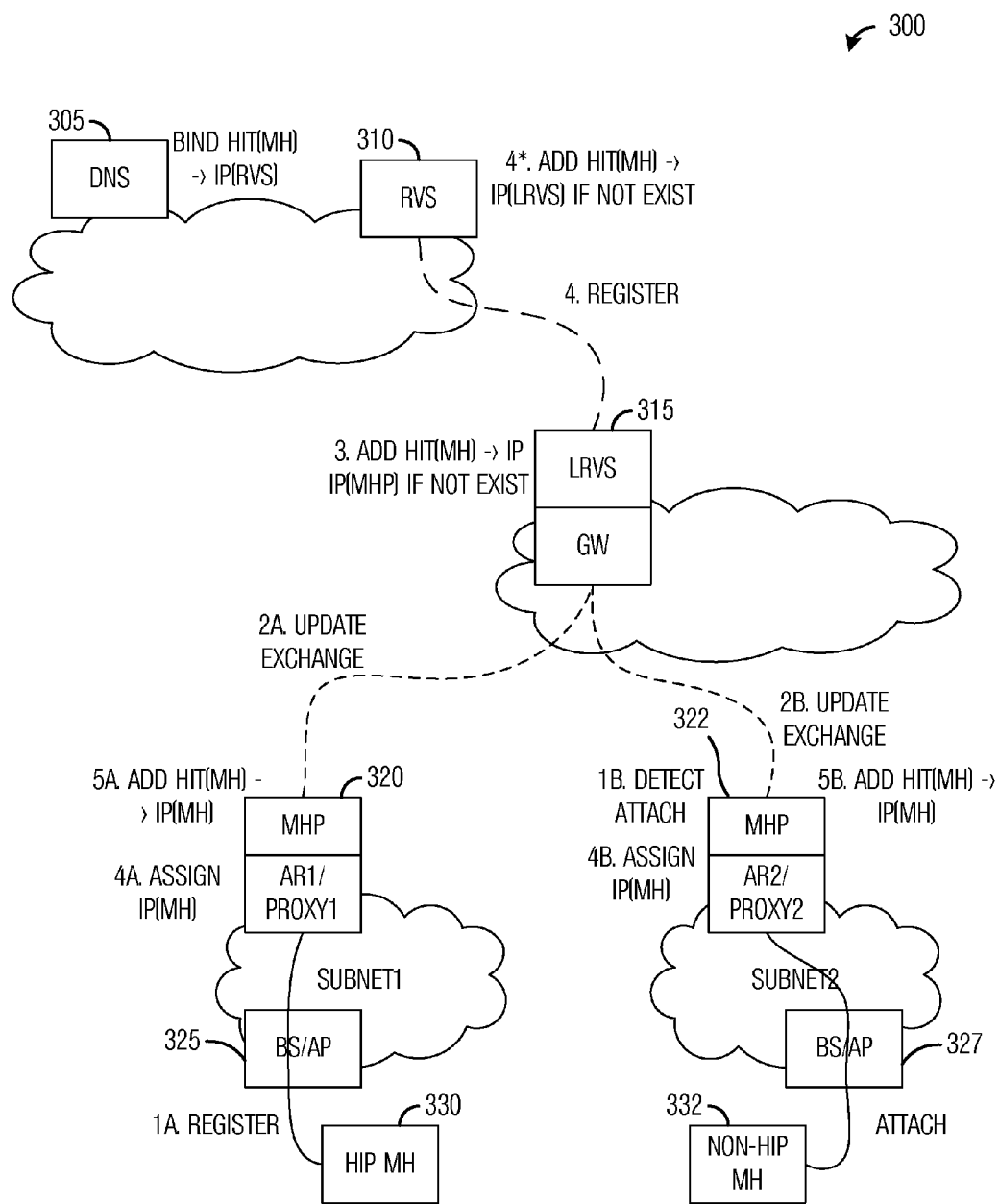
FIG. 3 illustrates an example wireless communications system 300 with information highlights shown for registration of a HIP enabled MH and a non-HIP enabled MH according to example embodiments described herein.

FIG. 3 illustrates a wireless communications system 300 with information highlights shown for registration of a HIP enabled MH and a non-HIP enabled MH. Wireless communications system 300 includes a DNS 305, a RVS 310, a LRVS 315, a first MHP 320, a second MHP 322, a first BS/AP 325, a second BS/AP 327, a first MH 330, and a second MH 332.

As shown in FIG. 3, first MH 330 is a HIP enabled MH and second MH 332 is a non-HIP enabled MH. Both MHs are registering and/or attaching with wireless communications system 300 through first BS/AP 325 and second BS/AP 327, respectively. The events involved in the registering and/or attaching process are shown in FIG. 3.

First MH 330 may register and attach with wireless communications system 300 through first BS/AP 325 to first MHP 320 (shown as event 1A). First MHP 320, knowing that first MH 330 is HIP enabled, assigns a HIT for first MH 330 and performs a binding information update with LRVS 315 (shown as part of event 2A).

According to an example embodiment, first MHP 320 may provide the HIT for first MH 330 (HIT(first MH 330)) as well as its (first MHP 320) IP address (IP(first MHP 320)) to LRVS 315. At LRVS 315, if HIT(first MH 330) and IP(first MHP 320) are not in binding information stored at LRVS 315, then LRVS 315 may store HIT(first MH 330) and IP(first MHP 320) in its binding information (shown as event 3). In general, LVRS 315 having to update its binding information is an event that is often not performed since LVRS 315 needs to update its binding information only if first MH 330 registers in an MHP (i.g., first MHP 320) that differs from a previous MHP to which it was registered or if first MH 330 is initially registering with wireless communications system 300.

According to an example embodiment, LRVS 315 also verifies the binding information from first MHP 320 and confirms receipt and successful processing of the binding information from first MHP 320 in a response to first MHP 320 (shown as even 2A).

According to an example embodiment, as registration process continues (shown as event 4) if LVRS 315 updated its binding information with HIT(first MH 330) and IP(first MHP 320), then LVRS 315 may provide the HIT for first MH 330 (HIT(first MH 330)) as well as its (LVRS 315) IP address (IP(LVRS 315)) to RVS 310. At RVS 310, if HIT(first MH 330) and IP(LVRS 315) are not in binding information stored at RVS 310, then RVS 310 may store HIT(first MH 330) and IP(LVRS 315) in its binding information (shown as event 4*). In general, VRS 310 having to update its binding information is an event that is rarely performed since VRS 310 needs to update its binding information only if first MH 330 registers in an MHP (i.g., first MHP 320) that is anchored by a LVRS that differs from a previous LVRS to which its previous MHP was anchored or if first MH 330 is initially registering with wireless communications system 300.

As the registration process continues, first MHP 320 also updates its binding information with HIT(first MH 330) and IP(first MH 330) (shown as event 5A). The registration process may complete with first MHP 320 performing a router advertisement (RA) of the IP prefix of first MH 330 and configuring as well as providing the IP address of first MH 330 to first MH 330.

Second MH 332 may attach with wireless communications system 300 through second BS/AP 327 to second MHP 322. Second MHP 322 may detect the attachment of second MH 332 to wireless communications system 300 (shown as event 1B). Second MHP 322, knowing that second MH 332 is non-HIP enabled, assigns a HIT for second MH 332 and performs a binding information update with LRVS 315 (shown as event 2B).

According to an example embodiment, second MHP 322 may provide the HIT for second MH 332 (HIT(second MH 332)) as well as its (second MHP 322) IP address (IP(second MHP 322)) to LRVS 315. At LRVS 315, if HIT(second MH 332) and IP(second MHP 322) are not in binding information stored at LRVS 315, then LRVS 315 may store HIT(second MH 332) and IP(second MHP 322) in its binding information (shown as event 3). In general, LVRS 315 having to update its binding information is an event that is often not performed since LVRS 315 needs to update its binding information only if second MH 332 registers in an MHP (i.g., second MHP 322) that differs from a previous MHP to which it was registered or if second MH 332 is initially registering with wireless communications system 300.

According to an example embodiment, LRVS 315 also verifies the binding information from second MHP 322 and confirms receipt and successful processing of the binding information from second MHP 322 in a response to second MHP 322 (shown as even 2B).

According to an example embodiment, as attachment (now referred to as an registration in HIP) process continues (shown as event 4) if LVRS 315 updated its binding information with HIT(second MH 332) and IP(second MHP 322), then LVRS 315 may provide the HIT for second MH 332 (HIT(second MH 332)) as well as its (LVRS 315) IP address (IP(LVRS 315)) to RVS 310. At RVS 310, if HIT(second MH 332) and IP(LVRS 315) are not in binding information stored at RVS 310, then RVS 310 may store HIT(second MH 332) and IP(LVRS 315) in its binding information (shown as event 4*). In general, VRS 310 having to update its binding information is an event that is rarely performed since VRS 310 needs to update its binding information only if second MH 332 registers in an MHP (i.g., second MHP 322) that is anchored by a LVRS that differs from a previous LVRS to which its previous MHP was anchored or if second MH 332 is initially registering with wireless communications system 300.

As the registration process continues, second MHP 322 also updates its binding information with HIT(second MH 332) and IP(second MH 332) (shown as event 5B). The registration process may complete with second MHP 322 performing a RA of the IP prefix of second MH 332 and configuring as well as providing the IP address of second MH 332 to second MH 332.

After registration, the MH (either first MH 330 or second MH 332) may become reachable from any correspondent host (CH) which may query DNS 305 about the location of the MH. In response to such a query, DNS 305 may reply with the IP address of the RVS to which the HIT of the MH is registered.

Figure 4A:
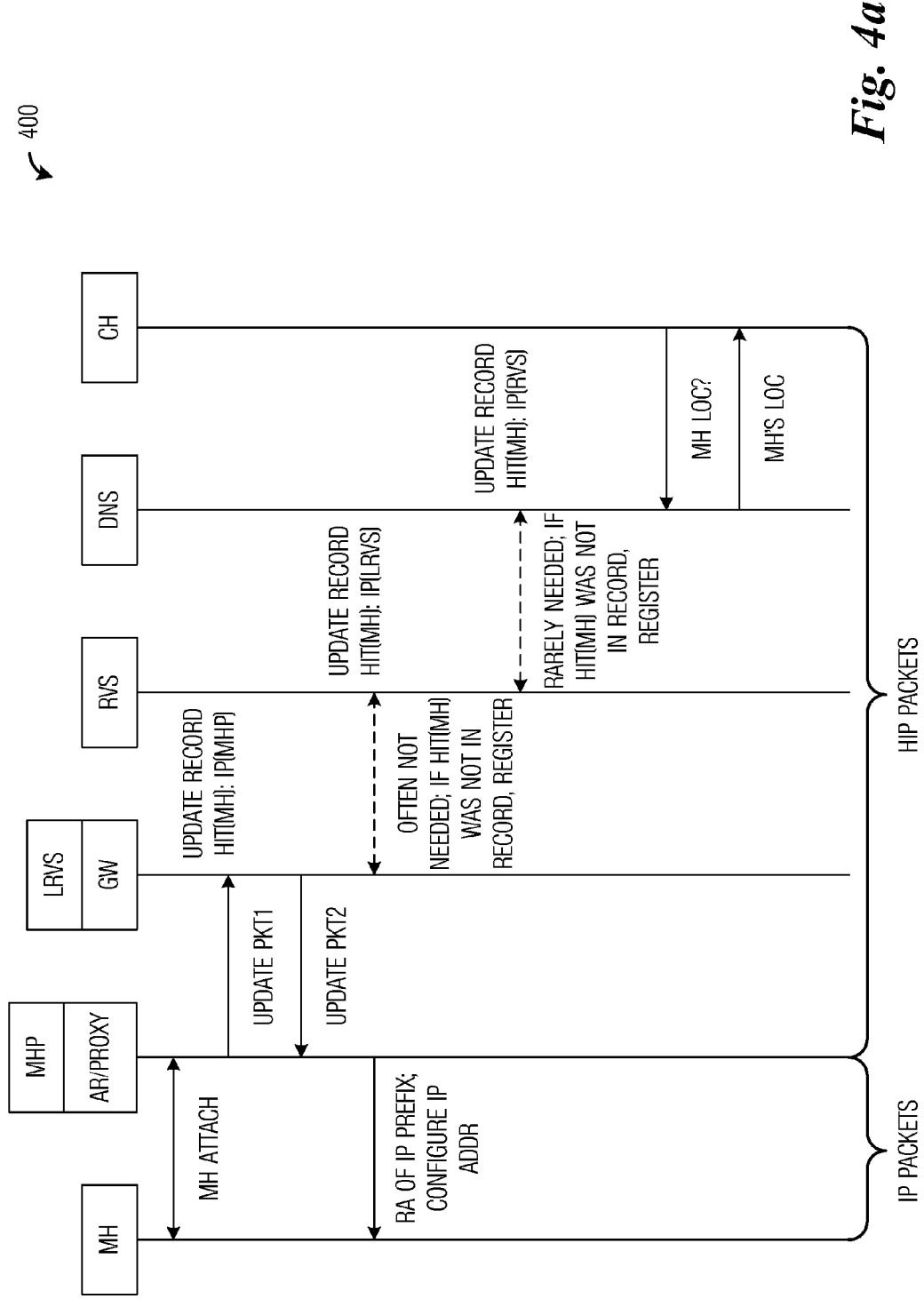
FIG. 4a illustrates an example diagram 400 of messages exchanged between entities in a wireless communications system as a non-HIP enabled MH attaches to the wireless communications system according to example embodiments described herein.

FIG. 4a illustrates a diagram 400 of messages exchanged between entities in a wireless communications system as a non-HIP enabled MH attaches to the wireless communications system. Since the MH is non-HIP enabled, communications between the MH and its MHP occurs with IP (or some other protocol) packets, which may be translated by the MHP into HIP packets, while communications between the MHP and other entities occur with HIP packets.

Figure 4B:
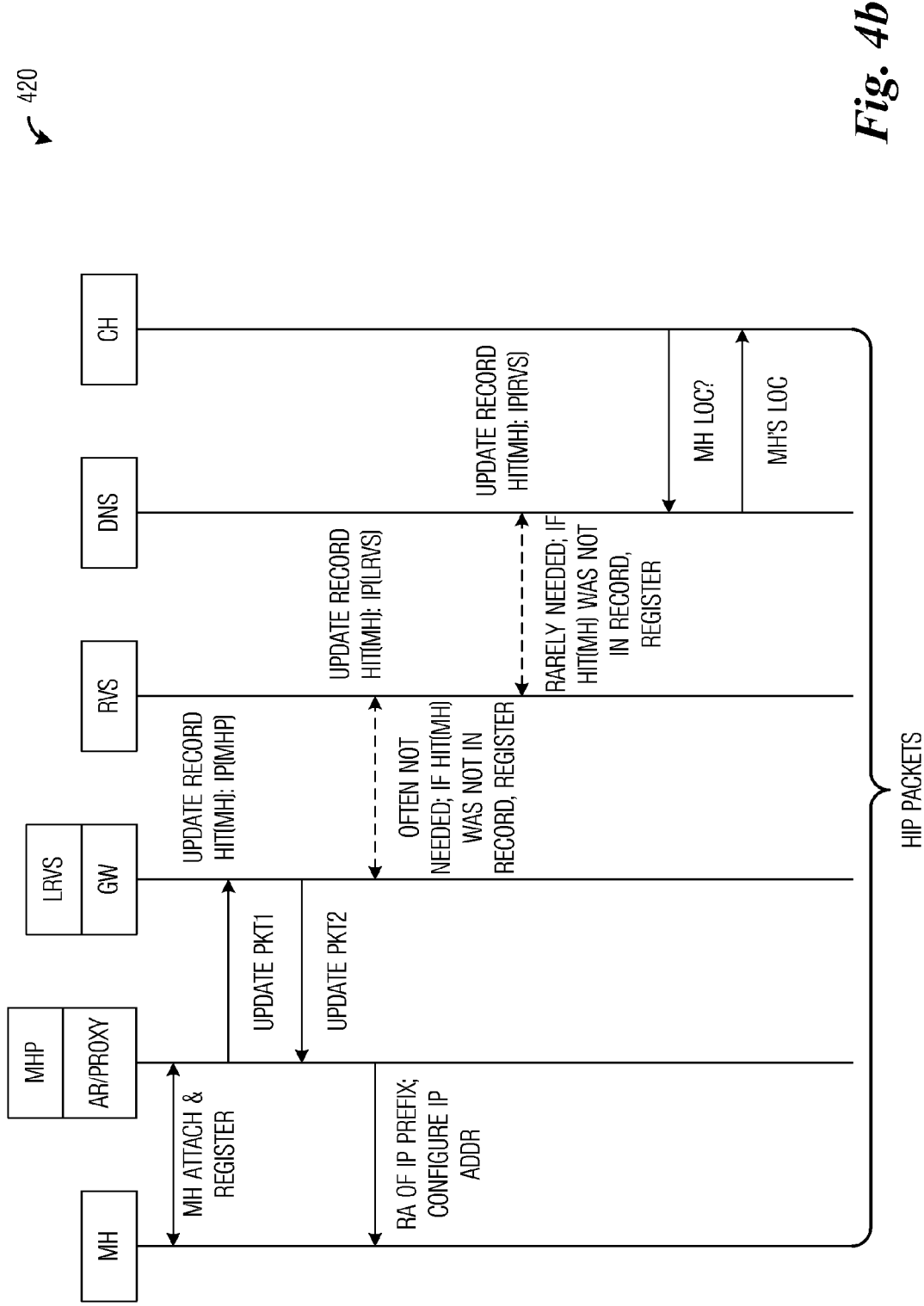
FIG. 4b illustrates an example diagram 420 of messages exchanged between entities in a wireless communications system as a HIP enabled MH attaches to the wireless communications system according to example embodiments described herein.

FIG. 4b illustrates a diagram 420 of messages exchanged between entities in a wireless communications system as a HIP enabled MH attaches to the wireless communications system. Since the MH is HIP enabled, communications throughout the attachment process is with HIP packets.

Figures 4C, 4D:
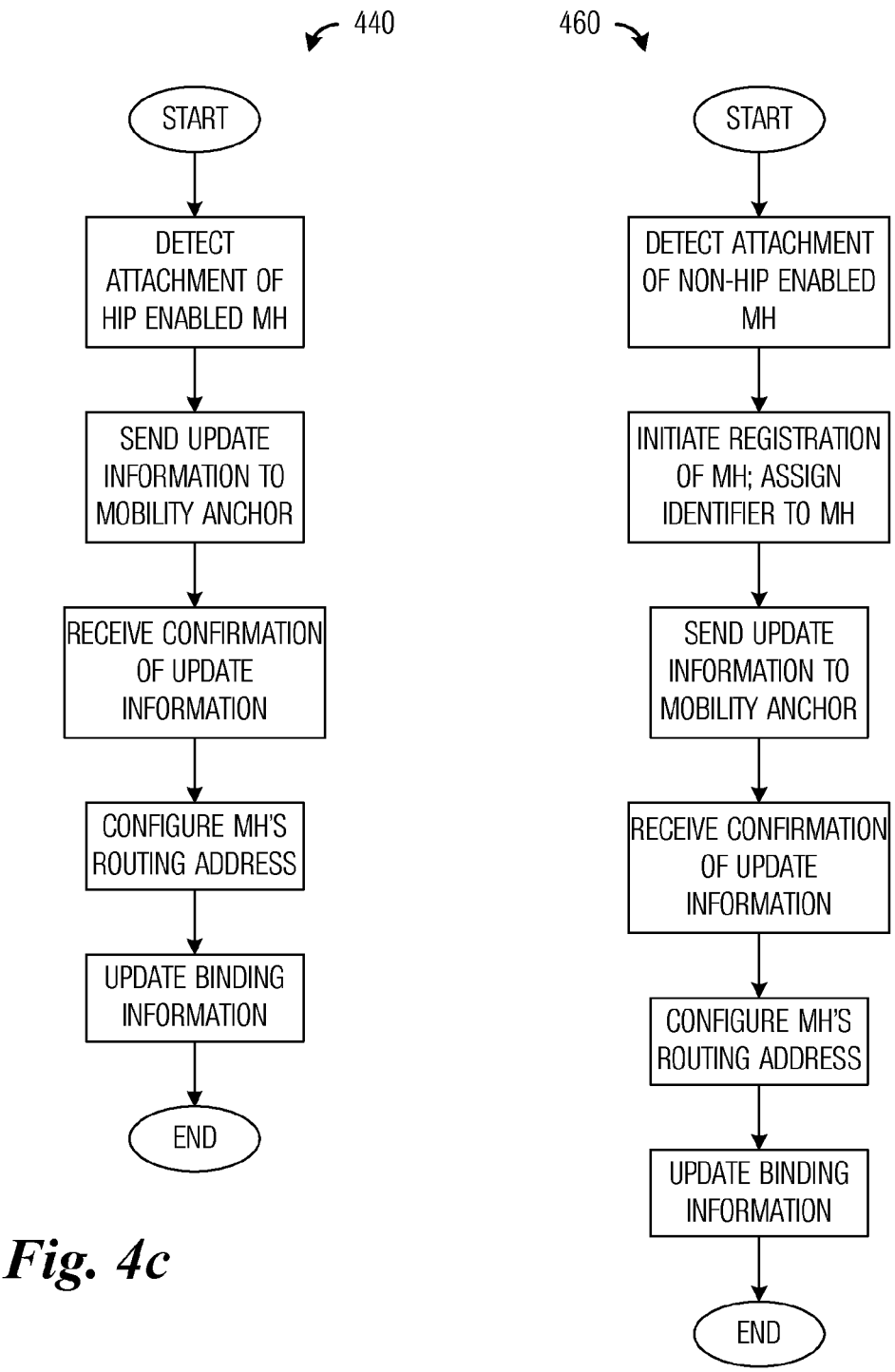
FIG. 4c illustrates an example flow diagram of MHP operations 440 for attachment of a HIP enabled MH according to example embodiments described herein.
FIG. 4d illustrates an example flow diagram of MHP operations 460 for attachment of a non-HIP enabled MH according to example embodiments described herein.

FIG. 4c illustrates a flow diagram of MHP operations 440 for attachment of a HIP enabled MH.

FIG. 4d illustrates a flow diagram of MHP operations 460 for attachment of a non-HIP enabled MH.

In addition to providing support for the registration and/or attachment of a MH to a wireless communications system, a MHP may also enable an exchange of data traffic between a MH (either HIP enabled or non-HIP enabled) and a CH (also either HIP enabled or non-HIP enabled). In order to support data traffic, a security association (SA) may be established prior to the data plane traffic begins. In general, if a MH is a HIP enabled MH, the SA at the MH side ends at the MH, while if the MH is a non-HIP enabled MH, the SA at the MH side ends at the MHP to which the MH is registered. Similarly, at the CH side, if the CH is a HIP enabled CH then the SA may end at the CH, while if the CH is a non-HIP enabled CH, then the SA may end at the MHP to which the CH is registered.

Figure 5A:
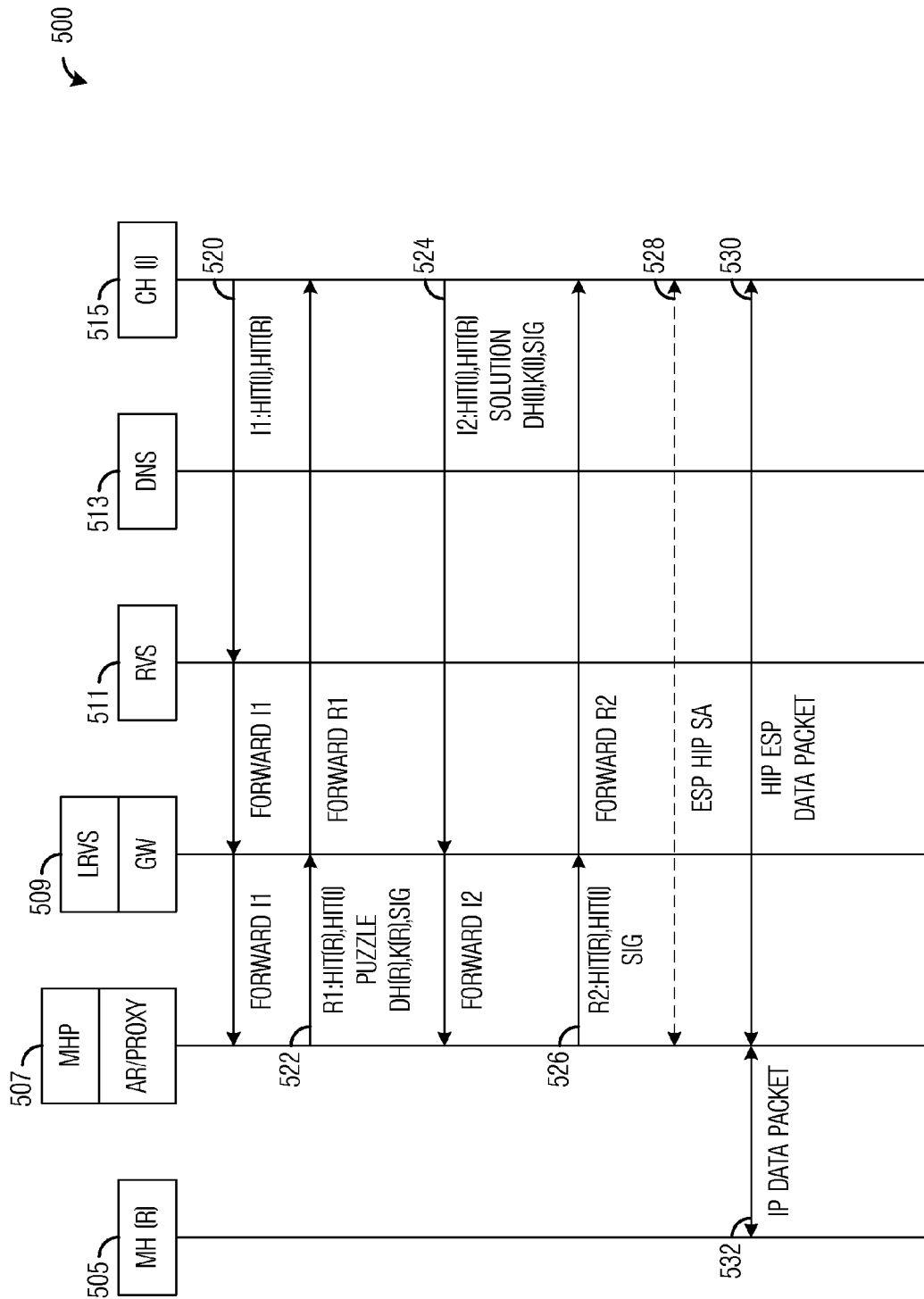
FIG. 5a illustrates an example diagram 500 of messages exchanged between entities in a wireless communications system as a non-HIP enabled MH and a CH exchange data traffic, wherein the CH is an initiator of the exchange according to example embodiments described herein.

FIG. 5a illustrates a diagram 500 of messages exchanged between entities in a wireless communications system as a non-HIP enabled MH and a CH exchange data traffic, wherein the CH is an initiator of the exchange. Although diagram 500 illustrates the message exchange between the non-HIP enabled MH and a CH that is initiated by the CH, a similar exchange may be initiated by the non-HIP enabled MH. As shown in FIG. 5a, the message exchange may involve entities including: a MH 505 (the non-HIP enabled MH), a MHP 507 (the MHP to which MH 505 is registered), a LRVS 509, a RVS 511, a DNS 513, and a CH 515 (the CH). Without loss of generality, consider a situation wherein both CH 515 and MH 505 are registered to the same RVS. If they are not registered to the same RVS, then additional entities, such as LRVS, MHP, and so forth may be involved in the message exchanged. However, the spirit of the message flow remains the same as if both share the same RVS. Therefore to simplify diagram 500, both CH 515 and MH 505 are considered to be registered to the same RVS.

Since CH 515 is the initiator of the message exchange, it may be labeled as (I), and MH 505, which is the responder, is labeled as (R). When MH 505 attaches to a MHP, MH 505 may first be registered according to a registration procedure as described above. After registration, MH 505 may become reachable to CH 515 which obtains the IP address of MH 505 from DNS 513.

Two pairs of initiation-response packets (referred to as I1, R1, I2, R2) may then be exchanged between an initiator (e.g., CH 515) and a responder (e.g., MH 505) to prepare for the establishment of a SA. In general, either CH 515 or MH 505 may be the initiator and the responder.

As shown in diagram 500, CH 515 (which may be HIP enabled or non-HIP enabled) may initiate a HIP SA from outside the domain of MH 505 by sending a message (e.g., an I1 packet) to RVS 511 (event 520). CH 515 may already have the IP address of RVS 511 (to which MH 505 is registered) by querying DNS 513. Upon receiving the I1 packet from CH 515, RVS 511 checks the destination HIT in the HIP header of the I1 packet. If the destination HIT is the HIT of a registered MH, then RVS 511 forwards the I1 packet to a registered IP address stored in its binding information that is associated with the destination HIT, i.e., the IP address of LRVS 509.

When LRVS 509 receives the I1 packet forwarded by RVS 511, LRVS 509 may check the destination HIT in the HIP header of the I1 packet. If the destination HIT is the HIT of a registered MH, then LRVS 509 forwards the I1 packet to a registered IP address stored in its binding information that is associated with the destination HIT, i.e., the IP address of MHP 507. LRVS 509 may also store the binding information HIT(CH 515) and IP(RVS 511) and IP(CH 515).

When MHP 507 receives the I1 packet from LRVS 509, MHP 507 checks the destination HIT in the HIP header of the I1 packet. If the destination HIT is the HIT of a registered MH that is non-HIP enabled (e.g., MH 505), then MHP 507 stores the binding information HIT(CH 515) and IP(LRVS 509) and IP(CH 515). MHP 507 may respond to the I1 packet by sending a R1 packet to CH 515 on the behalf of MH 505 to LRVS 509 (event 522).

LRVS 509 may check the destination HIT in the HIP header of the R1 packet. If the destination HIT is the HIT of a registered CH, then LRVS 509 forwards the R1 packet to a registered IP address stored in its binding information that is associated with the destination HIT, i.e., the IP address of CH 515. Since LRVS 509 stored the binding information HIT(CH 515) and IP(RVS 511) and IP(CH 515) when it processed the I1 packet, LRVS 509 may send the R1 packet directly to CH 515.

When CH 515 receives the R1 packet from LRVS 509, CH 515 may store the binding information HIT(MH 505) and IP(LRVS 509) and IP(MH505). CH 515 may respond to the R1 packet with an I2 packet containing the HIT of MH 505 (event 524). Due to its updated binding information, the I2 packet is sent directly to LRVS 509, which may forward it to MHP 507.

MHP 507, again operating on behalf of MH 505 since MH 505 is non-HIP enabled, may respond to the I2 packet with a R2 packet containing the HIT of CH 515 (event 526). The R2 packet may be sent to LRVS 509, which may forward the R2 packet to CH 515.

After successful exchange of the two initiation-response packet pairs (I1 R1, I2, and R2), a HIP SA will be established between the initiator and responder (event 528). During the establishment of the SA, all the proxies (e.g., MHP 507) along the path between MH 505 and LRVS 509 will be aware of the SA context. After establishing the HIP SA, data traffic using Enhanced Services Plan (ESP) may be exchanged between the initiator (CH 515) and responder (MH 505) (event 530). However, since MH 505 is non-HIP enabled, MHP 507 may de-encapsulate data packets from CH 515 and destined for MH 505, i.e., translate HIP packets into IP packets. MHP 507 may also encapsulate data packets from MH 505 destined for CH 515, i.e., translate IP packets into HIP packets.

In general, for a non-HIP enabled host, e.g., MH 505, a MHP acts as a HIP proxy in the data plane. The MHP encapsulates data packets originated from the non-HIP enabled host and de-encapsulates data packets destined for the non-HIP enabled host.

Figure 5B:
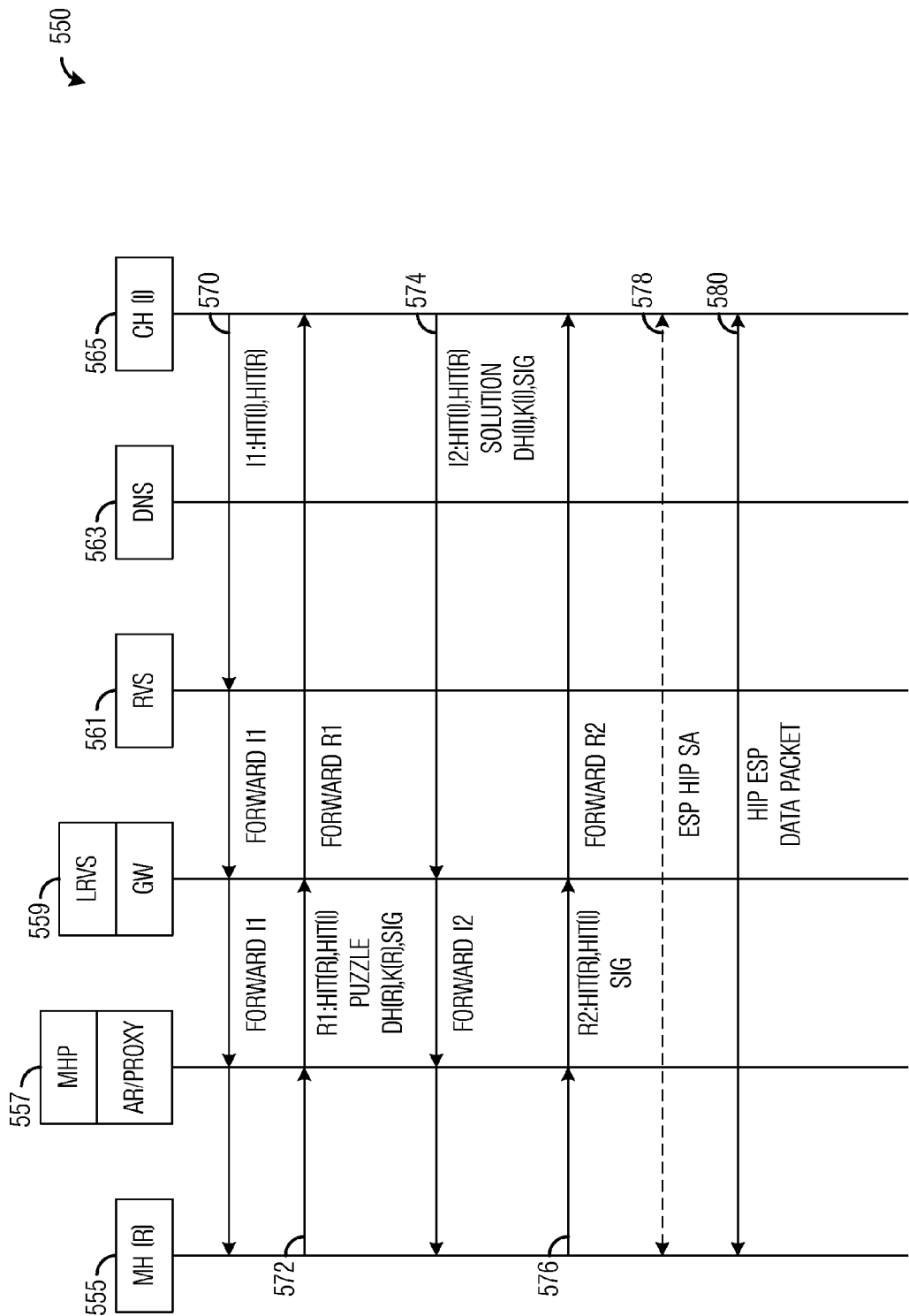
FIG. 5b illustrates an example diagram 550 of messages exchanged between entities in a wireless communications system as a HIP enabled MH and a CH exchange data traffic, wherein the CH is an initiator of the exchange according to example embodiments described herein.

FIG. 5b illustrates a diagram 550 of messages exchanged between entities in a wireless communications system as a HIP enabled MH and a CH exchange data traffic, wherein the CH is an initiator of the exchange. Although diagram 550 illustrates the message exchange between the HIP enabled MH and a CH that is initiated by the CH, a similar exchange may be initiated by the non-HIP enabled MH. As shown in FIG. 5b, the message exchange may involve entities including: a MH 555 (the HIP enabled MH), a MHP 557 (the MHP to which MH 555 is registered), a LRVS 559, a RVS 561, a DNS 563, and a CH 565 (the CH). Without loss of generality, consider a situation wherein both CH 565 and MH 555 are registered to the same RVS. If they are not registered to the same RVS, then additional entities, such as LRVS, MHP, and so forth may be involved in the message exchanged. However, the spirit of the message flow remains the same as if both share the same RVS. Therefore to simplify diagram 550, both CH 565 and MH 555 are considered to be registered to the same RVS.

Since CH 565 is the initiator of the message exchange, it may be labeled as (I), and MH 555, which is the responder, is labeled as (R). When MH 555 attaches to a MHP, MH 555 may first be registered according to a registration procedure as described above. After registration, MH 555 may become reachable to CH 565 which obtains the IP address of MH 555 from DNS 563.

Two pairs of initiation-response packets (referred to as I1, R1, I2, R2) may then be exchanged between an initiator (e.g., CH 565) and a responder (e.g., MH 555) to prepare for the establishment of a SA. In general, either CH 565 or MH 555 may be the initiator and the responder.

As shown in diagram 550, CH 565 (which may be HIP enabled or non-HIP enabled) may initiate a HIP SA from outside the domain of MH 555 by sending a message (e.g., an I1 packet) to RVS 561 (event 570). CH 565 may already have the IP address of RVS 561 (to which MH 555 is registered) by querying DNS 563. Upon receiving the I1 packet from CH 565, RVS 561 checks the destination HIT in the HIP header of the I1 packet. If the destination HIT is the HIT of a registered MH, then RVS 561 forwards the I1 packet to a registered IP address stored in its binding information that is associated with the destination HIT, i.e., the IP address of LRVS 559.

When LRVS 559 receives the I1 packet forwarded by RVS 561, LRVS 559 may check the destination HIT in the HIP header of the I1 packet. If the destination HIT is the HIT of a registered MH, then LRVS 559 forwards the I1 packet to a registered IP address stored in its binding information that is associated with the destination HIT, i.e., the IP address of MHP 557. LRVS 559 may also store the binding information HIT(CH 565) and IP(RVS 561) and IP(CH 565). LRVS 559 may also store the binding information HI(CH 565) and IP (LRVS 559).

When MHP 557 receives the I1 packet from LRVS 559, MHP 557 checks the destination HIT in the HIP header of the I1 packet. If the destination HIT is the HIT of a registered MH that is HIP enabled (e.g., MH 555), then MHP 557 stores the binding information HIT(CH 565) and IP(LRVS 559) and IP(CH 565). MHP 557 may the forward the I1 packet MH 555. MH 555, upon receipt of the I1 packet may respond to the I1 packet by sending a R1 packet to CH 565 by way of MHP 557 (event 572).

MHP 557, after receiving the R1 packet, may check the destination HIT of the HIP header of the R1 packet and forward the R1 packet to a registered IP address associated with the destination HIT, i.e., the IP address of LRVS 559. Upon receipt of the R1 packet, LRVS 559 may check the destination HIT in the HIP header of the R1 packet. If the destination HIT is the HIT of a registered CH, then LRVS 559 forwards the R1 packet to a registered IP address stored in its binding information that is associated with the destination HIT, i.e., the IP address of CH 565. Since LRVS 559 stored the binding information HIT(CH 565) and IP(RVS 561) and IP(CH 565) when it processed the I1 packet, LRVS 559 may send the R1 packet directly to CH 565.

When CH 565 receives the R1 packet from LRVS 559, CH 565 may store the binding information HIT(MH 555) and IP(LRVS 559) and IP(MH 555). CH 565 may also store the binding information HIT(CH 565) and IP(CH 565). CH 565 may respond to the R1 packet with an I2 packet containing the HIT of MH 555 (event 574). Due to its updated binding information, the I2 packet is sent directly to LRVS 559, which may forward it to MHP 557.

MHP 557 may then forward the I2 packet to MH 555. MH 555, upon receipt of the I2 packet may respond to the I2 packet with a R2 packet containing the HIT of CH 565 (event 576). The R2 packet may be sent to MHP 557, which may then forward the R2 packet to LRVS 559, which may then forward the R2 packet to CH 565.

After successful exchange of the two initiation-response packet pairs (IL R1, I2, and R2), a HIP SA will be established between the initiator and responder (event 578). During the establishment of the SA, all the proxies (e.g., MHP 557) along the path between MH 555 and LRVS 559 will be aware of the SA context. After establishing the HIP SA, data traffic using Enhanced Services Plan (ESP) may be exchanged between the initiator (CH 565) and responder (MH 555) (event 580). However, since MH 555 is HIP enabled, MHP 557 may not need to de-encapsulate data packets from CH 565 and destined for MH 555, i.e., translate HIP packets into IP packets. MHP 557 may not need to also encapsulate data packets from MH 555 destined for CH 565, i.e., translate IP packets into HIP packets.

Figures 5C, 5D:
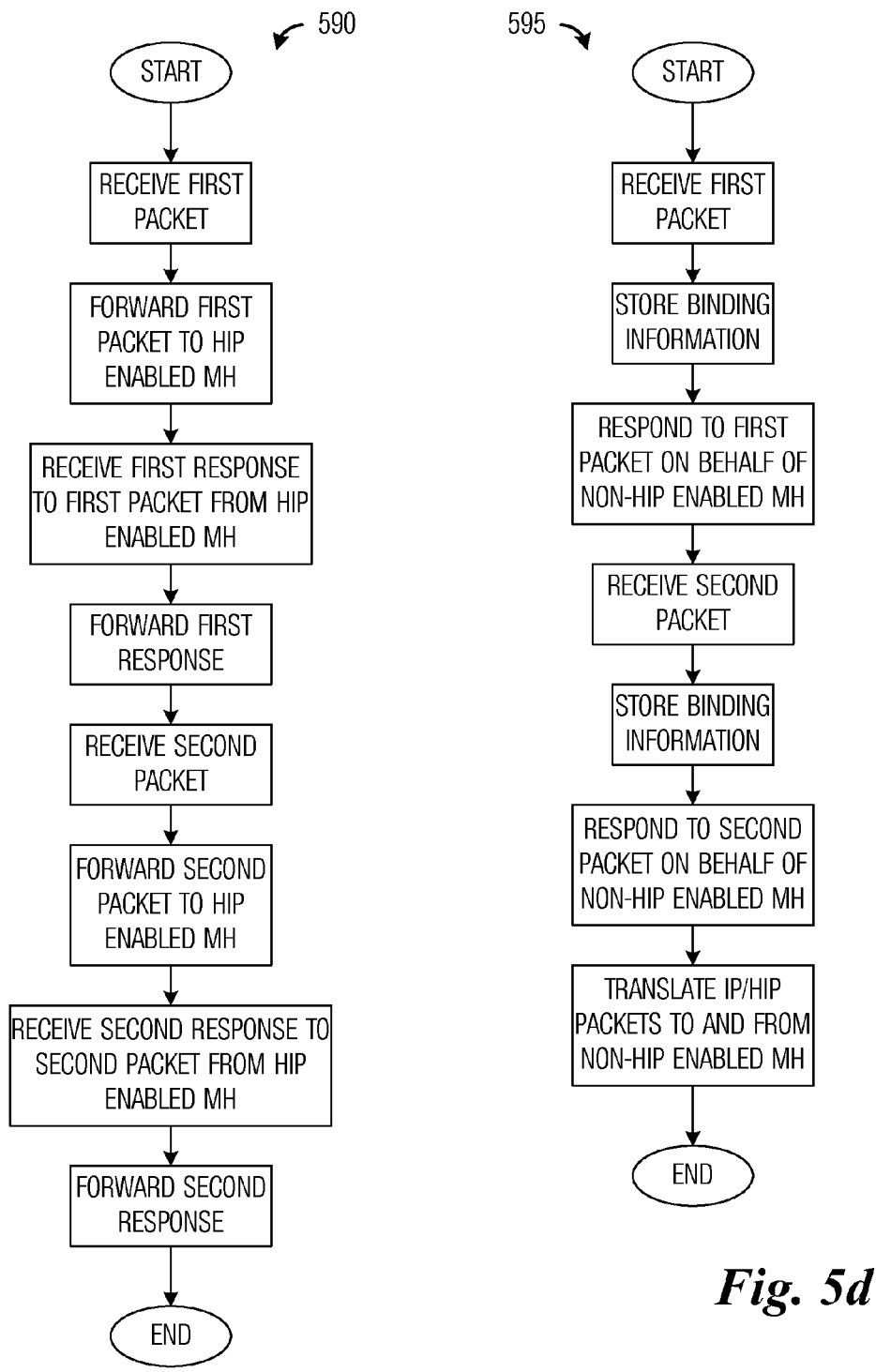
FIG. 5c illustrates an example flow diagram of MHP operations 590 in the establishing of a data traffic exchange between a HIP enabled MH and a HIP enabled CH according to example embodiments described herein.
FIG. 5d illustrates an example flow diagram of MHP operations 595 in the establishing of a data traffic exchange between a non-HIP enabled MH and a HIP enabled CH according to example embodiments described herein.

FIG. 5c illustrates a flow diagram of MHP operations 590 in the establishing of a data traffic exchange between a HIP enabled MH and a HIP enabled CH.

FIG. 5d illustrates a flow diagram of MHP operations 595 in the establishing of a data traffic exchange between a non-HIP enabled MH and a HIP enabled CH.

Figure 6A:
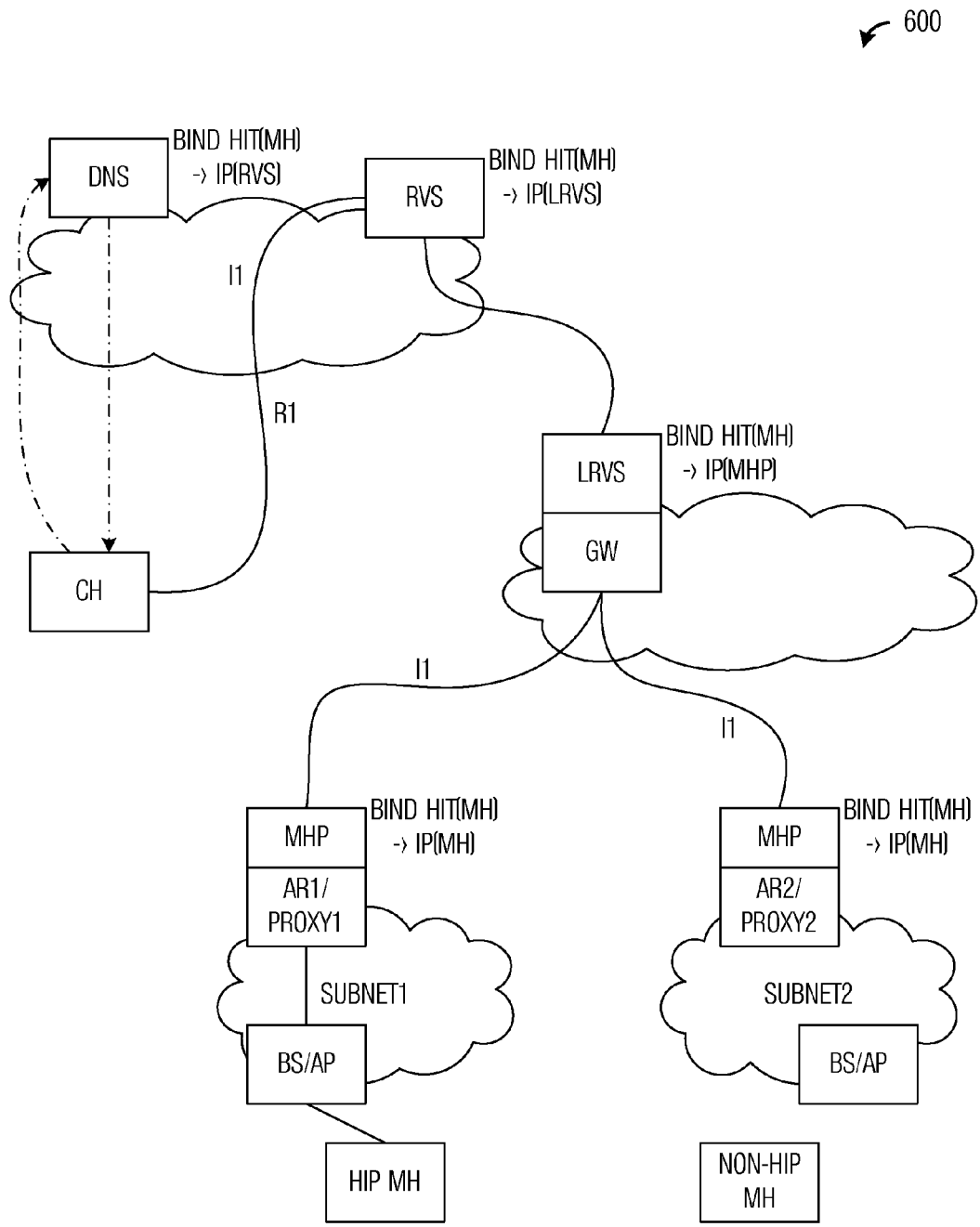
FIG. 6a illustrates an example wireless communications system 600 with information highlights shown for a flow of an I1 packet from a CH to a MH according to example embodiments described herein.

FIG. 6a illustrates a wireless communications system 600 with information highlights shown for a flow of an I1 packet from a CH to a MH.

Figure 6B:
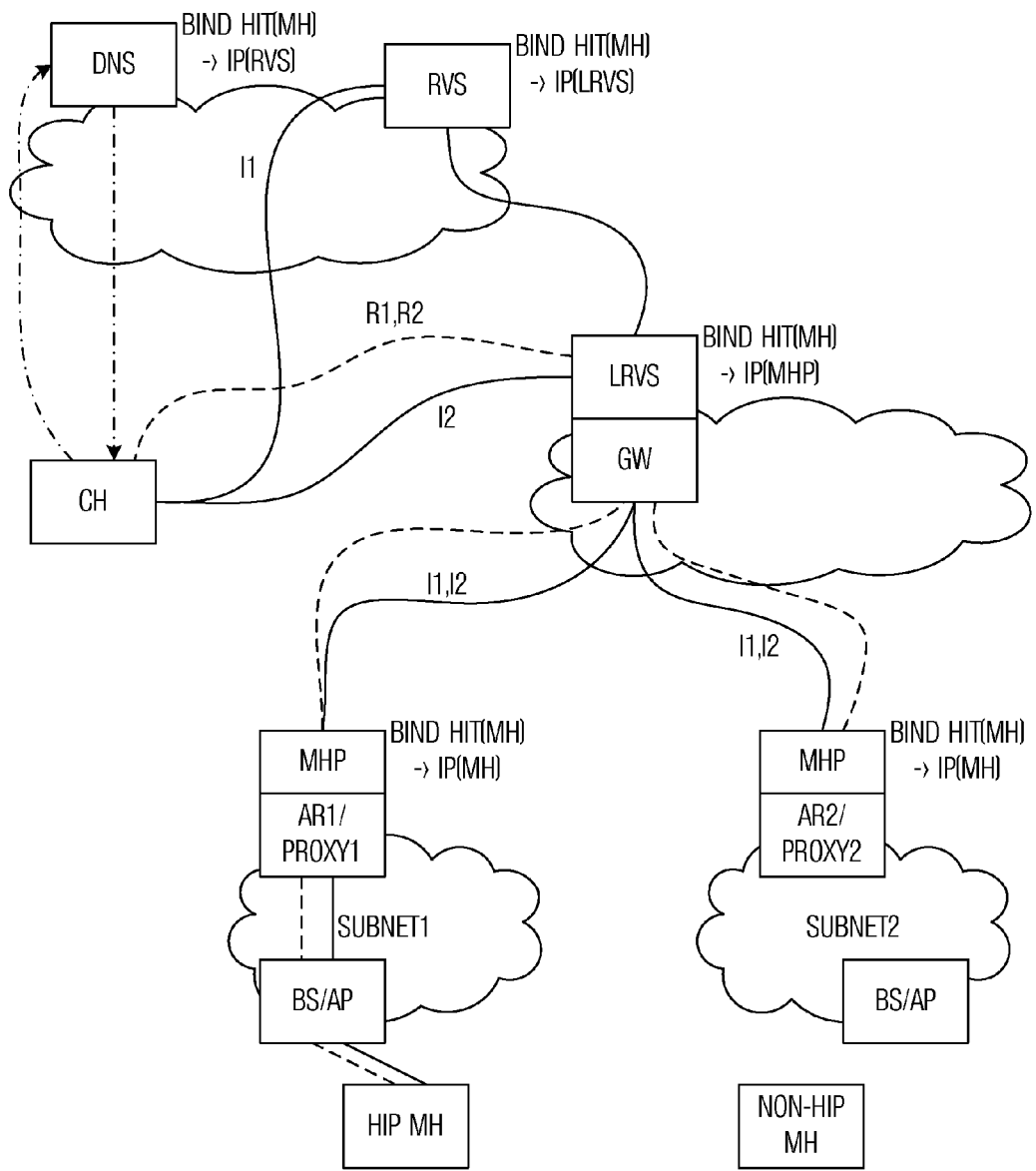
FIG. 6b illustrates an example wireless communications system 650 with information highlights shown for a flow of I1, R1, I2, and R2 packets from a CH to a MH according to example embodiments described herein.

FIG. 6b illustrates a wireless communications system 650 with information highlights shown for a flow of I1, R1, I2, and R2 packets from a CH to a MH.

As a MH moves around, it may be necessary for the MH to participate in a handover, wherein the MH changes access networks. A handover may be necessary because the MH has moved to an area where a current access network has poor or no coverage and a new access network has better coverage. Different handover scenarios may occur, including but not limited to: the MH either being HIP enabled or non-HIP enabled, the current access network and the new access network belonging to a single domain managed by a single LVRS, the current access network and the new access network belonging to different domains managed by different LVRSs, and so forth.

A non-HIP enabled MH may change its point of access (a current MHP from the current access network) and attach to a new MHP from the new access network under the same LRVS. The new access network may be of the same or different network type as the previous access network. Irrespective of the type of access network to which the new MHP is connected and irrespective of whether the MH is HIP enabled or non-HIP enabled, the new MHP will be informed about the attachment of the arriving MH. The new MHP acts as the HIP proxy. The new MHP also updates the binding record of the MH at the LRVS. To do that, the new MHP needs to know the context of the HIP SA and the HIT of the MH. Generally, a mechanism to securely share this security context with the proxies that MH moves to is needed.

Figure 7A:
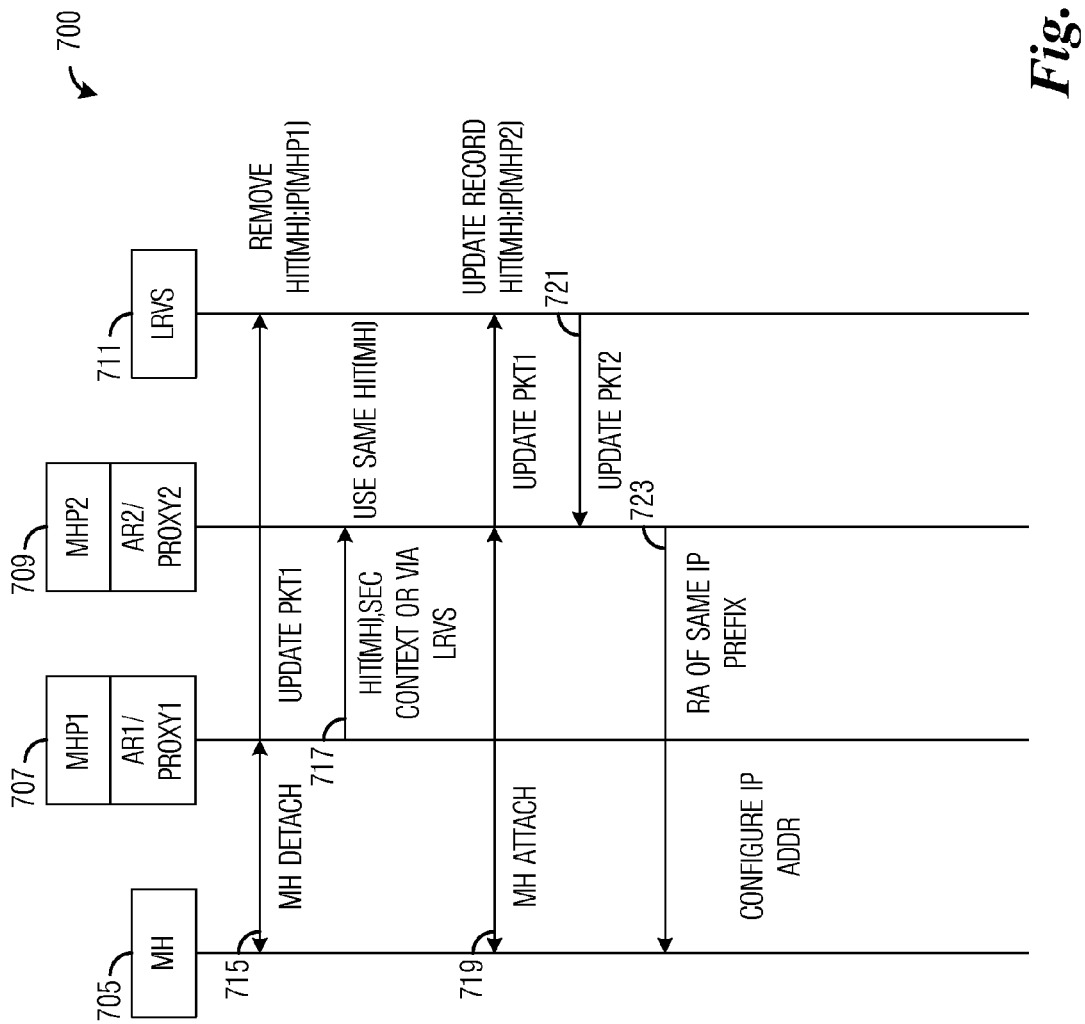
FIG. 7a illustrates an example diagram 700 of messages exchanged between entities in a wireless communications system as a non-HIP enabled MH handovers from a current access network and a new access network with both access networks belonging to a single domain managed by a single LRVS, i.e., an intra-domain handover according to example embodiments described herein.

FIG. 7a illustrates a diagram 700 of messages exchanged between entities in a wireless communications system as a non-HIP enabled MH handovers from a current access network and a new access network with both access networks belonging to a single domain managed by a single LRVS, i.e., an intra-domain handover. Furthermore, the MH is communicating with a HIP enabled CH in a different domain but both the MH and the CH are registered at the same RVS. The message exchange may involve entities including: a MH 705, a first MHP 707 (MHP for the current access network), a second MHP 709 (MHP for the new access network), and a LRVS 711. Since both the MH and the CH are registered at the same RVS, some entities, such as a RVS and a DNS, may not need to be shown. Furthermore, the CH is not shown to maintain simplicity of diagram 700.

As part of the handover procedure, MH 705 may detach from first MHP 707 (event 715). Since MH 705 is no longer served by first MHP 707, first MHP 707 may delete binding information related to MH 705. Additionally, first MHP 707 may send an update packet to LRVS 711 to inform LRVS 711 that MH 705 is no longer being served by first MHP 707. At LRVS 711, LRVS 711 may deregister first MHP 707 by removing binding information related to first MHP 707 and MH 705, such as HIT(MH 705) and IP(first MHP 707).

First MHP 707 may also provide updates regarding MH 705 to some or all of its neighboring MHPs, for example, first MHP 707 may send an update to second MHP 709 (event 717). According to an example embodiment, first MHP 707 may send the update to second MHP 709, which may include binding information HIT(MH 705), by way of a security context or from LRVS 711. The same binding information HIT(MH 705) may be used.

MH 705 may then attach to second MHP 709 (event 719). Since MH 705 is a non-HIP enabled MH, second MHP 709 may need to detect the attachment of MH 705. Second MHP 709 may make use of the binding information provided by first MHP 707. Second MHP 709 may send an update to LRVS 711, which may update its binding information with HIT(MH 705) and IP(second MHP 709).

In general, when a non-HIP enabled MH attaches to a MHP, such as second MHP 709, the MHP may register the MH using a registration procedure as discussed previously and assigns a HIT to the MH (e.g., HIT(MH 705) for MH 705).

For a non-HIP enabled MH, the MHP may act as the HIP proxy in the data plane.

A GW, which may be co-located with LRVS 711, may be in charge of IP prefix allocation. The GW has knowledge that MH 705 with HIT(MH 705) being attached to second MHP 709 is the same MH that is being detached from first MHP 707. The GW may then inform second MHP 709 that the IP prefix was previously assigned to MH 705.

LRVS 711 may inform second MHP 709 of the successful update with a response (event 721). When second MHP 709 receives the response from LRVS 711, second MHP 709 may send a RA to MH 705 (event 723). Second MHP 709 may have knowledge regarding MH 705 with HIT(MH 705). The RA sent by second MHP 709 may have the same network prefix that MH 705 had previously used with first MHP 707 to configure its IP address. MH 705 therefore retains the same IP address configuration so that duplicate address detection (DAD) is not needed. Not having to use DAD may significantly reduce handover latency and signaling overhead, thereby resulting in shorter handover delay and potentially fewer packets lost.

Furthermore, the use of the same IP address in intra-domain handover also supports location privacy.

FIG. 7b illustrates a flow diagram of current MHP operations 760 as a non-HIP enabled MH handovers from a current access network and a new access network with both access networks belonging to a single domain managed by a single LRVS.

FIG. 7c illustrates a flow diagram of new MHP operations 780 as a non-HIP enabled MH handovers from a current access network and a new access network with both access networks belonging to a single domain managed by a single LRVS.

Figure 8A:
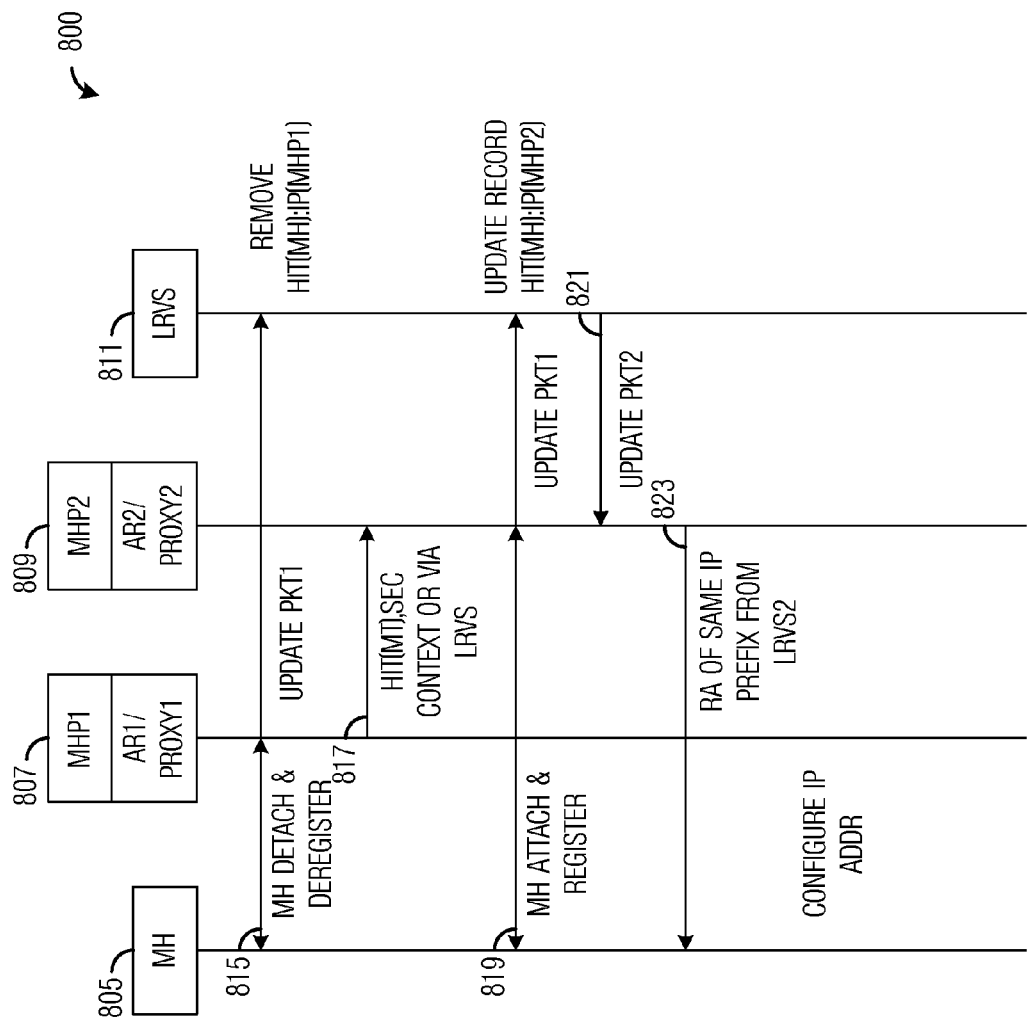
FIG. 8a illustrates an example diagram 800 of messages exchanged between entities in a wireless communications system as a HIP enabled MH handovers from a current access network and a new access network with both access networks belonging to a single domain managed by a single LRVS, i.e., an intra-domain handover according to example embodiments described herein.

FIG. 8a illustrates a diagram 800 of messages exchanged between entities in a wireless communications system as a HIP enabled MH handovers from a current access network and a new access network with both access networks belonging to a single domain managed by a single LRVS, i.e., an intra-domain handover. Furthermore, the MH is communicating with a HIP enabled CH in a different domain but both the MH and the CH are registered at the same RVS. The message exchange may involve entities including: a MH 805, a first MHP 807 (MHP for the current access network), a second MHP 809 (MHP for the new access network), and a LRVS 811. Since both the MH and the CH are registered at the same RVS, some entities, such as a RVS and a DNS, may not need to be shown. Furthermore, the CH is not shown to maintain simplicity of diagram 800.

As part of the handover procedure, MH 805 may detach from first MHP 807 (event 815). Since MH 805 is no longer served by first MHP 807, first MHP 807 may delete binding information related to MH 805. Additionally, first MHP 807 may send an update packet to LRVS 811 to inform LRVS 811 that MH 805 is no longer being served by first MHP 807. At LRVS 811, LRVS 811 may deregister first MHP 807 by removing binding information related to first MHP 807 and MH 805, such as HIT(MH 805) and IP(first MHP 807).

First MHP 807 may also provide updates regarding MH 805 to some or all of its neighboring MHPs, for example, first MHP 807 may send an update to second MHP 809 (event 817). According to an example embodiment, first MHP 807 may send the update to second MHP 809, which may include binding information HIT(MH 805), by way of a security context or from LRVS 811. The same binding information HIT(MH 805) may be used.

MH 805 may then attach to and register with second MHP 809 (event 819). Second MHP 809 may make use of the binding information provided by first MHP 807. Second MHP 809 may send an update to LRVS 811, which may update its binding information with HIT(MH 805) and IP(second MHP 809).

In general, when a HIP enabled MH attaches to a MHP, such as second MHP 809, the MHP may register the MH using a registration procedure as discussed previously and assigns a HIT to the MH (e.g., HIT(MH 805) for MH 805).

A GW, which may be co-located with LRVS 811, may be in charge of IP prefix allocation. The GW has knowledge that MH 805 with HIT(MH 805) being attached to second MHP 809 is the same MH that is being detached from first MHP 807. The GW may then inform second MHP 809 that the IP prefix was previously assigned to MH 805.

LRVS 811 may inform second MHP 809 of the successful update with a response (event 821). When second MHP 809 receives the response from LRVS 811, second MHP 809 may send a RA to MH 805 (event 823). Second MHP 809 may have knowledge regarding MH 805 with HIT(MH 805). The RA sent by second MHP 809 may have the same network prefix that MH 805 had previously used with first MHP 807 to configure its IP address. MH 805 therefore retains the same IP address configuration so that duplicate address detection (DAD) is not needed. Not having to use DAD may significantly reduce handover latency and signaling overhead, thereby resulting in shorter handover delay and potentially fewer packets lost.

The use of the same IP address enables the MH (a HIP enabled MH) to use the established HIP associations during and after the handover as the communication context remains the same. Therefore the re-establishment of HIP SA is not required, resulting in time reduction to perform initiation-response exchange to further reduce the handover delay.

Furthermore, the use of the same IP address in intra-domain handover also supports location privacy.

Figures 8B, 8C:
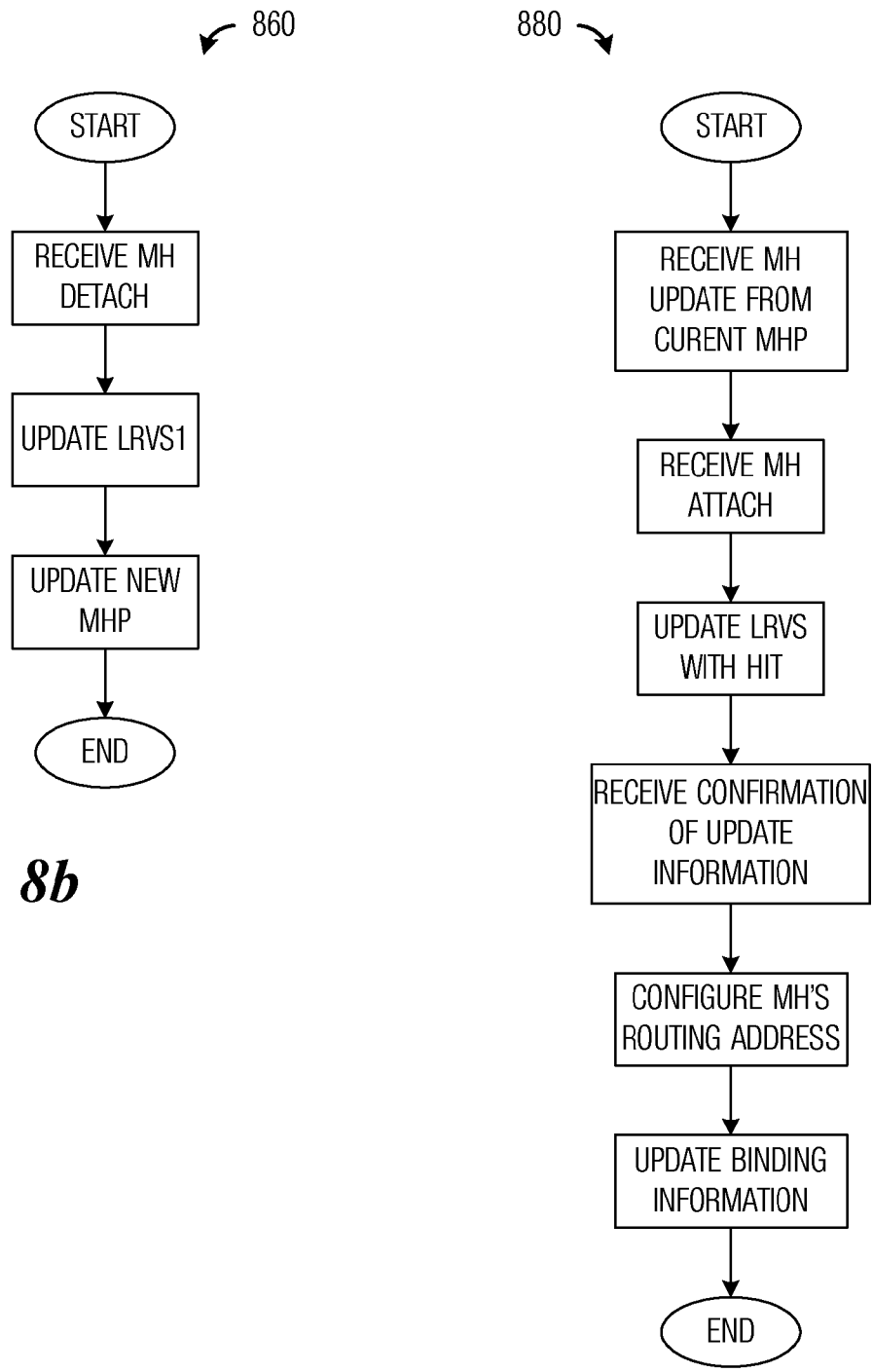
FIG. 8b illustrates an example flow diagram of current MHP operations 860 as a HIP enabled MH handovers from a current access network and a new access network with both access networks belonging to a single domain managed by a single LRVS according to example embodiments described herein.
FIG. 8c illustrates an example flow diagram of new MHP operations 880 as a HIP enabled MH handovers from a current access network and a new access network with both access networks belonging to a single domain managed by a single LRVS according to example embodiments described herein.

FIG. 8b illustrates a flow diagram of current MHP operations 860 as a HIP enabled MH handovers from a current access network and a new access network with both access networks belonging to a single domain managed by a single LRVS.

FIG. 8c illustrates a flow diagram of new MHP operations 880 as a HIP enabled MH handovers from a current access network and a new access network with both access networks belonging to a single domain managed by a single LRVS.

Figure 9A:
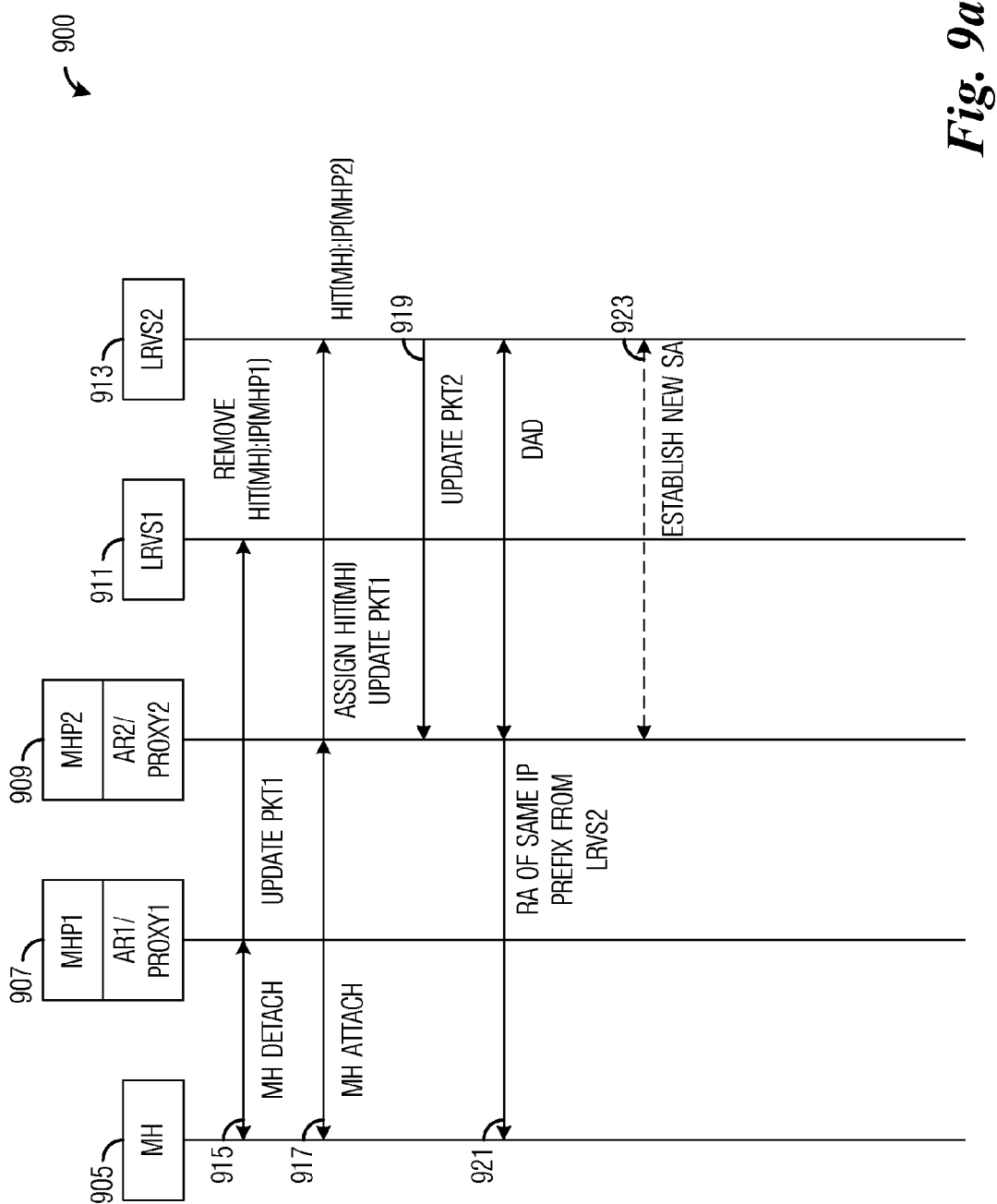
FIG. 9a illustrates an example diagram 900 of messages exchanged between entities in a wireless communications system as a non-HIP enabled MH handovers from a current access network and a new access network with the access networks belonging to different domain managed by different LRVS, i.e., an inter-domain handover according to example embodiments described herein.

FIG. 9a illustrates a diagram 900 of messages exchanged between entities in a wireless communications system as a non-HIP enabled MH handovers from a current access network and a new access network with the access networks belonging to different domain managed by different LRVSs, i.e., an inter-domain handover. Furthermore, the MH is communicating with a HIP enabled CH in CH in a different domain but both the MH and the CH are registered at the same RVS. The message exchange may involve entities including: a MH 905, a first MHP 907 (MHP for the current access network), a second MHP 909 (MHP for the new access network), a first LRVS 911 (LRVS for the current access network), and a second LRVS 913 (LRVS for the new access network). Since both the MH and the CH are registered at the same RVS, some entities, such as a RVS and a DNS, may not need to be shown. Furthermore, the CH is not shown to maintain simplicity of diagram 900.

According to an example embodiment, since the handover is not under the same LRVS (i.e., an inter-domain handover), the current MHP (first MHP 907) may send update information packet1 to the current LRVS (first LRVS 911), whereas the new MHP (second MHP 909) may send update information to the new LRVS (second LRVS 913). The new LRVS (second LRVS 913) may have no record of the HIT of the MH (HIT(MH 905)) attaching to second MHP 909. Second LRVS 913 may therefore assign a new IP prefix to MH 905. With a new IP prefix, it is then necessary to perform DAD and to establish a new SA.

As part of the handover procedure, MH 905 may detach from first MHP 907 (event 915). Since MH 905 is no longer served by first MHP 907, first MHP 907 may delete binding information related to MH 905. Additionally, first MHP 907 may send an update packet to first LRVS 911 to inform first LRVS 911 that MH 905 is no longer being served by first MHP 907. At first LRVS 911, first LRVS 911 may deregister first MHP 907 by removing binding information related to first MHP 907 and MH 905, such as HIT(MH 905) and IP(first MHP 907).

MH 905 may then attach to second MHP 909 (event 917). Since MH 905 is a non-HIP enabled MH, second MHP 909 may need to detect the attachment of MH 905. Second MHP 909 may send an update to second LRVS 913, which may update its binding information with HIT(MH 905) and IP(second MHP 909).

In general, when a non-HIP enabled MH attaches to a MHP, such as second MHP 909, the MHP may register the MH using a registration procedure as discussed previously and assigns a HIT to the MH (e.g., HIT(MH 905) for MH 905).

Second LRVS 913 may inform second MHP 909 of the successful update with a response (event 919). When second MHP 909 receives the response from second LRVS 913, second MHP 909 may send a RA to MH 905 (event 921). Second MHP 909 may not have knowledge regarding MH 905 with HIT(MH 905). The RA sent by second MHP 909 may have a different network prefix that MH 905 had previously used with first MHP 907 to configure its IP address. MH 905 therefore is unlikely to have the same IP address configuration so DAD is likely to be needed. Second LRVS 913 may also establish a new SA with second MHP 909.

It may be possible that the new LRVS (second LRVS 913) and the current LRVS (first LRVS 911) belong to different RVSs. In such a situation, MH 905 may need to perform registration as discussed above.

Figures 9B, 9C:
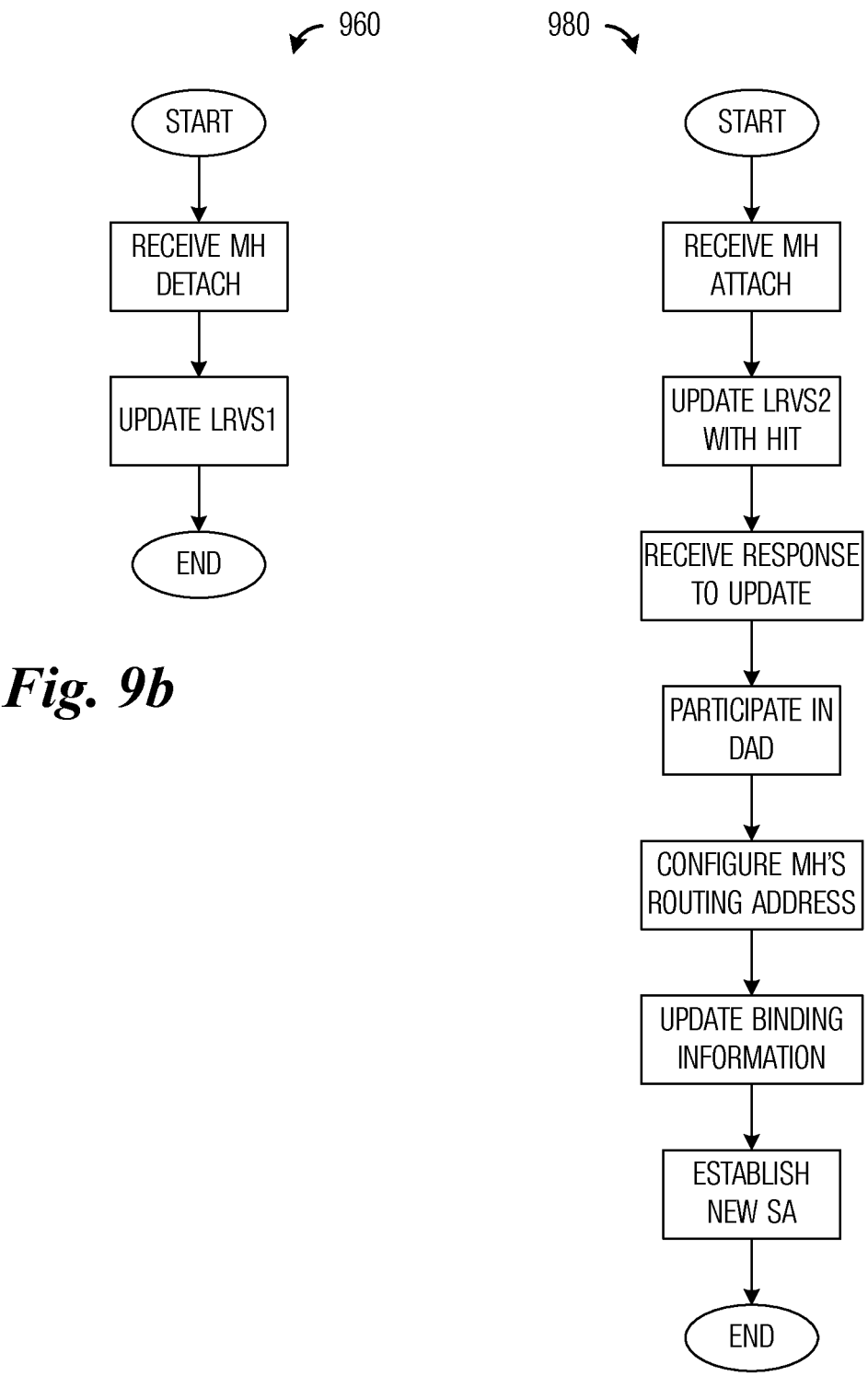
FIG. 9b illustrates an example flow diagram of current MHP operations 960 as a non-HIP enabled MH handovers from a current access network and a new access network with the access networks belonging to different domain managed by different LRVS according to example embodiments described herein.
FIG. 9c illustrates an example flow diagram of new MHP operations 980 as a non-HIP enabled MH handovers from a current access network and a new access network with the access networks belonging to different domain managed by different LRVS according to example embodiments described herein.

FIG. 9b illustrates a flow diagram of current MHP operations 960 as a non-HIP enabled MH handovers from a current access network and a new access network with the access networks belonging to different domain managed by different LRVS.

FIG. 9c illustrates a flow diagram of new MHP operations 980 as a non-HIP enabled MH handovers from a current access network and a new access network with the access networks belonging to different domain managed by different LRVS.

Figure 10A:
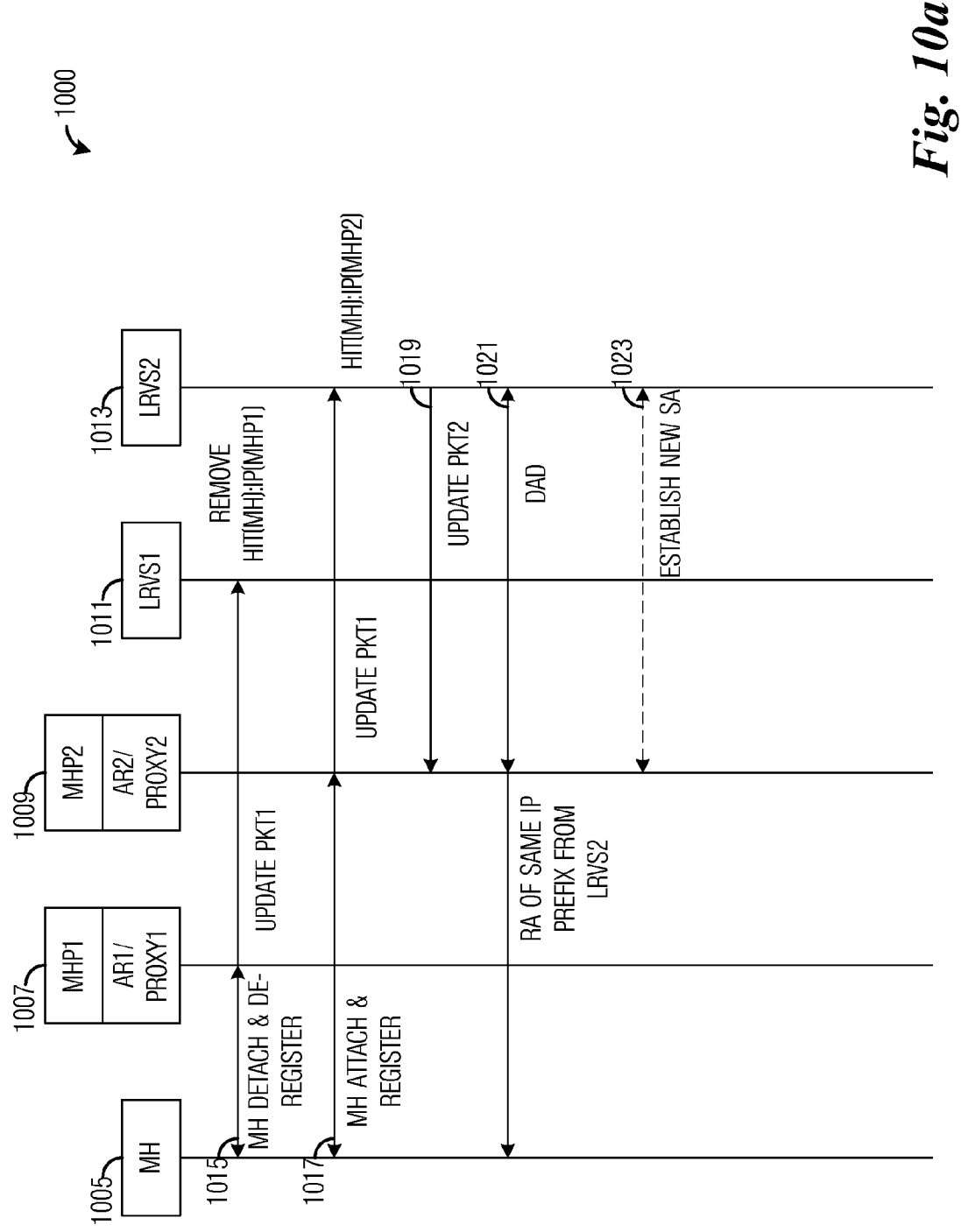
FIG. 10a illustrates an example diagram 1000 of messages exchanged between entities in a wireless communications system as a HIP enabled MH handovers from a current access network and a new access network with the access networks belonging to different domain managed by different LRVS, i.e., an inter-domain handover according to example embodiments described herein.

FIG. 10a illustrates a diagram 1000 of messages exchanged between entities in a wireless communications system as a HIP enabled MH handovers from a current access network and a new access network with the access networks belonging to different domain managed by different LRVS, i.e., an inter-domain handover. Furthermore, the MH is communicating with a HIP enabled CH in CH in a different domain but both the MH and the CH are registered at the same RVS. The message exchange may involve entities including: a MH 1005, a first MHP 1007 (MHP for the current access network), a second MHP 1009 (MHP for the new access network), a first LRVS 1011 (LRVS for the current access network), and a second LRVS 1013 (LRVS for the new access network). Since both the MH and the CH are registered at the same RVS, some entities, such as a RVS and a DNS, may not need to be shown. Furthermore, the CH is not shown to maintain simplicity of diagram 1000.

According to an example embodiment, since the handover is not under the same LRVS (i.e., an inter-domain handover), the current MHP (first MHP 1007) may send update information packet1 to the current LRVS (first LRVS 1011), whereas the new MHP (second MHP 1009) may send update information to the new LRVS (second LRVS 1013). The new LRVS (second LRVS 1013) may have no record of the HIT of the MH (HIT(MH 1005)) attaching to second MHP 1009. Second LRVS 1013 may therefore assign a new IP prefix to MH 1005. With a new IP prefix, it is then necessary to perform DAD and to establish a new SA.

As part of the handover procedure, MH 1005 may detach from first MHP 1007 (event 1015). Since MH 1005 is no longer served by first MHP 1007, first MHP 1007 may delete binding information related to MH 1005. Additionally, first MHP 1007 may send an update packet to first LRVS 1011 to inform first LRVS 1011 that MH 1005 is no longer being served by first MHP 1007. At first LRVS 1011, first LRVS 10911 may deregister first MHP 1007 by removing binding information related to first MHP 1007 and MH 1005, such as HIT(MH 1005) and IP(first MHP 1007).

MH 1005 may then attach to and register with second MHP 1009 (event 1017). Second MHP 1009 may send an update to second LRVS 1013, which may update its binding information with HIT(MH 1005) and IP(second MHP 1009).

In general, when a HIP enabled MH attaches to a MHP, such as second MHP 1009, the MHP may register the MH using a registration procedure as discussed previously and assigns a HIT to the MH (e.g., HIT(MH 1005) for MH 1005).

Second LRVS 1013 may inform second MHP 1009 of the successful update with a response (event 1019). When second MHP 1009 receives the response from second LRVS 1013, second MHP 1009 may send a RA to MH 1005 (event 1021). Second MHP 1009 may not have knowledge regarding MH 1005 with HIT(MH 1005). The RA sent by second MHP 1009 may have a different network prefix that MH 1005 had previously used with first MHP 1007 to configure its IP address. MH 1005 therefore is unlikely to have the same IP address configuration so DAD is likely to be needed. Second LRVS 1013 may also establish a new SA with second MHP 1009.

It may be possible that the new LRVS (second LRVS 1013) and the current LRVS (first LRVS 1011) belong to different RVSs. In such a situation, MH 1005 may need to perform registration as discussed above.

Figures 10B, 10C:
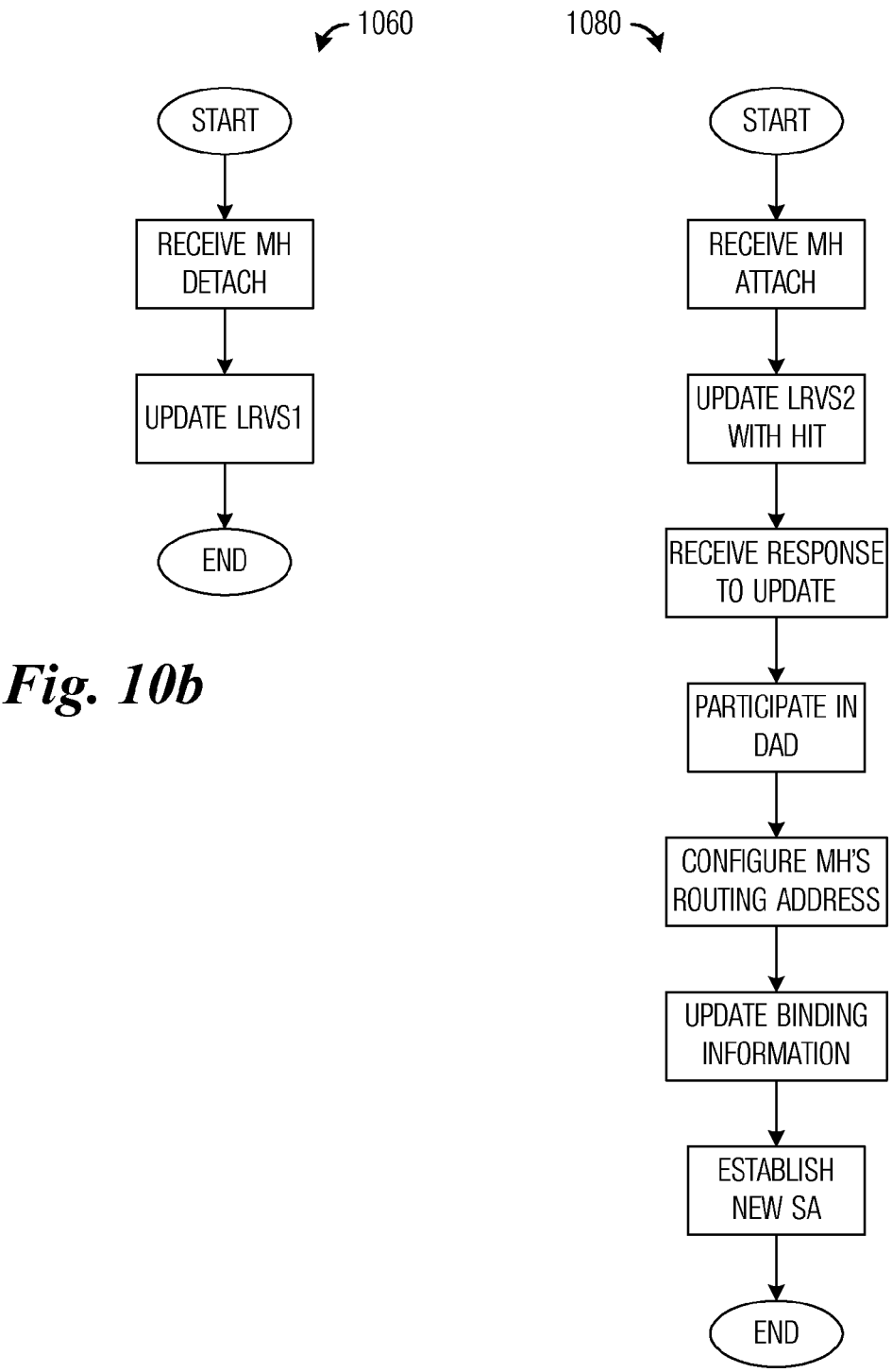
FIG. 10b illustrates an example flow diagram of current MHP operations 1060 as a HIP enabled MH handovers from a current access network and a new access network with the access networks belonging to different domain managed by different LRVS according to example embodiments described herein.
FIG. 10c illustrates an example flow diagram of new MHP operations 1080 as a HIP enabled MH handovers from a current access network and a new access network with the access networks belonging to different domain managed by different LRVS according to example embodiments described herein.

FIG. 10b illustrates a flow diagram of current MHP operations 1060 as a HIP enabled MH handovers from a current access network and a new access network with the access networks belonging to different domain managed by different LRVS.

FIG. 10c illustrates a flow diagram of new MHP operations 1080 as a HIP enabled MH handovers from a current access network and a new access network with the access networks belonging to different domain managed by different LRVS.

According to an example embodiment, having a proxy may also eliminate the need for a new location reachability check between the MH and its peers, because the new location of the MH is known to the MH's MHP. A number of proxies in a domain may depend on the domain's size and each subnet is managed by a MHP which acts as an authoritative proxy for that subnet. When an authoritative proxy is not functional, its subnet may be managed by a neighboring proxy. The number of MHs in each subnet may not exceed the capability of the proxy.

According to an example embodiment, "double move" scenarios where the MH and the CH perform handovers at the same time may also be managed by the embodiments described herein. Furthermore, multi-homing is also managed.

Figure 11:
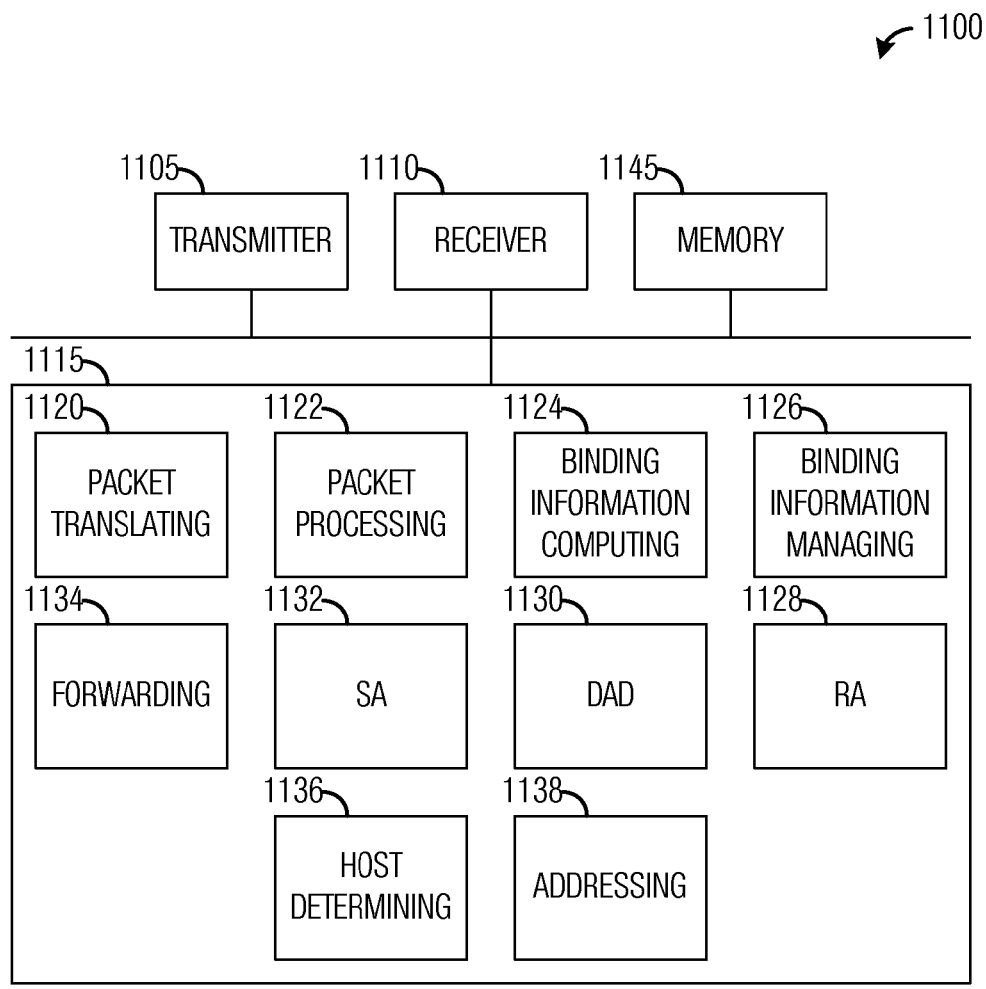
FIG. 11 provides an example illustration of a communications device 1100 according to example embodiments described herein.

FIG. 11 provides an alternate illustration of a communications device 1100. Communications device 1100 may be an implementation of a MHP. Communications device 1100 may be used to implement various ones of the embodiments discussed herein. As shown in FIG. 11, a transmitter 1105 is configured to transmit information and a receiver 1110 is configured to receive information.

A packet translating unit 1120 is configured to translate packets from a first format (e.g., HIP) into a second format (e.g., IP) and vice versa. A packet processing unit 1122 is configured to process a packet based on a nature of the packet. A binding information computing unit 1124 is configured to compute binding information based on presence of binding information stored in a memory 1145, a database, or so forth.

A binding information managing unit 1126 is configured to manage (e.g., determine if binding information needs to be updated, modified, added, deleted, or so forth) binding information stored in memory 1145, database, or so forth. A RA unit 1128 is configured to perform router advertisement. A DAD unit 1130 is configured to participate in duplicate address detection. A SA unit 1132 is configured to establish a security association. A forwarding unit 1134 is configured to forward packets based on binding information and/or header information.

A host determining unit 1136 is configured to determine a nature of a host (e.g., is the host HIP enabled or non-HIP enabled). An addressing unit 1138 is configured to configure an addressing identifier (e.g., an IP address) for a communications device. Collectively, binding information managing unit 1126, RA unit 1128, DAD unit 1130, and SA unit 1132 may help to support mobility functions in a HIP enabled host. A memory 1145 is configured to store information, such as binding information, as well as packets, and so on.

The elements of communications device 1100 may be implemented as specific hardware logic blocks. In an alternative, the elements of communications device 1100 may be implemented as software executing in a processor, controller, application specific integrated circuit, or so on. In yet another alternative, the elements of communications device 1100 may be implemented as a combination of software and/or hardware.

As an example, transmitter 1105 and receiver 1110 may be implemented as a specific hardware block, while packet translating unit 1120, packet processing unit 1122, binding information computing unit 1124, binding information managing unit 1126, RA unit 1128, DAD unit 1130, SA unit 1132, forwarding unit 1134, host determining unit 1136, and addressing unit 1138 may be software modules executing in a microprocessor (such as processor 1115), a custom circuit, a custom compiled logic array of a field programmable logic array, or combinations thereof.

The above described embodiments of communications device 1100 may also be illustrated in terms of methods comprising functional steps and/or non-functional acts. The previous description and related flow diagrams illustrate steps and/or acts that may be performed in practicing example embodiments of the present invention. Usually, functional steps describe the invention in terms of results that are accomplished, whereas non-functional acts describe more specific actions for achieving a particular result. Although the functional steps and/or non-functional acts may be described or claimed in a particular order, the present invention is not necessarily limited to any particular ordering or combination of steps and/or acts. Further, the use (or non use) of steps and/or acts in the recitation of the claims—and in the description of the flow diagrams(s) for FIGS. 2a, 2b, 4c, 4d, 5c, 5d, 7b, 7c, 8b, 8c, 9b, 9c, 10b, and 10c—is used to indicate the desired specific use (or non-use) of such terms.

Advantageous features of embodiments of the invention may include: a method or system to enable network-based mobility management to both HIP and non-HIP hosts by integrating a network-based mobility management function and proxy HIP function at the network access router.

Advantageous features of embodiments of the invention may include: a method or system to improve handover performance for both HIP and non-HIP hosts by integrating a network-based mobility management function and proxy HIP function at the network access router. The network-based mobility management function may include mobile hosts tracking, location update, security signaling, assigning of network prefix per host identifier, and using the same network prefix within the same network domain to avoid duplicate address detection (DAD).

Advantageous features of embodiments of the invention may include: a method or system to enable a mobile host, which may or may not be HIP-enabled, may move from one access network to another access network in the same domain without changing its IP address while communicating with a correspondent host, which may or may not be HIP-enabled, in the same or different domain.

Advantageous features of embodiments of the invention may include: a method or system to enable a mobile host, which may or may not be HIP-enabled, may handover from one type of wireless interface (such as WLAN) to a different type of wireless interface (such as WiMAX) in the same domain without changing its IP address while communicating with a correspondent host, which may or may not be HIP-enabled, in the same or different domain.

Advantageous features of embodiments of the invention may include: a method or system to enable a mobile host, which may or may not be HIP-enabled, may move from one access network in one domain to another access network in a different domain while communicating with a correspondent host, which may or may not be HIP-enabled. Its IP address may change.

Advantageous features of embodiments of the invention may include: methods disclosed above wherein both the MH and the CH move (participate in handovers) simultaneously.

Advantageous features of embodiments of the invention may include: a method for proxy operations, the method comprising: determining if a communications device is capable of performing an operation; forwarding a transmission to a destination of the transmission if the communications device is capable of performing an operation; and responding to the transmission on behalf of the communications device if the communications device is not capable of performing an operation.

The method could further include, wherein determining if a communications device is capable of performing an operation comprises determining if the communications device is capable of supporting a communications protocol. The method could further include, wherein the communications protocol supports multiple identifiers for a single communications entity. The method could further include, wherein the multiple identifiers comprises a first identifier for identification purposes and a second identifier for addressing purposes. The method could further include, wherein the communications protocol comprises a Host Identity Protocol. The method could further include, wherein responding to the transmission comprises: processing the transmission; and forwarding the transmission to the destination of the transmission. The method could further include, wherein responding to the transmission further comprises translating the transmission from a first format to a second format. The method could further include, wherein the destination is the communications device, and wherein the translating comprises de-encapsulating the transmission. The method could further include, wherein a source of the transmission is the communications device, and wherein the translating comprises encapsulating the transmission.

Advantageous features of embodiments of the invention may include: a proxy comprising: a host determining unit configured to determine if a communications device is capable of performing an operation; a forwarding unit coupled to the host determining unit, the forwarding unit configured to forward a transmission to a destination of the transmission if communications device is capable of performing an operation; and a response unit coupled to the host determining unit, the response unit configured to respond to the transmission on behalf of the communications device if the communications device is not capable of performing an operation.

The method could further include, wherein the response unit comprises a packet processing unit configured to process the transmission. The method could further include, wherein the response unit further comprises a packet translating unit coupled to the packet processing unit, the packet translating unit is configured to translate the transmission from a first format to a second format.

Advantageous features of embodiments of the invention may include: a method for proxy operations, the method comprising: determining that a communications device is attaching to a communications system; assigning an identifier for the communications device; updating binding information for the communications device at a server, wherein the binding information comprises the identifier; and configuring an addressing identifier for the communications device.

The method could further include, wherein determining that a communications device is attaching comprises detecting transmissions from the communications device, wherein the transmissions comprise messages exchanged in order for the communications device to attach to the communications system. The method could further include, wherein determining that a communications device is attaching comprises receiving an attach message from the communications device. The method could further include, wherein the identifier is used for identification. The method could further include, wherein updating binding information comprises transmitting the identifier and an addressing identifier for the proxy. The method could further include, wherein the binding information is transmitted to the server. The method could further include, further comprising receiving a response from the server, wherein the response comprises configuration information. The method could further include, wherein configuring an addressing identifier for the communications device is based on the configuration information. The method could further include, further comprising transmitting the addressing identifier for the communications device to the communications device.

Advantageous features of embodiments of the invention may include: a proxy comprising: a packet processing unit configured to determine if a communications device is attaching to a communications system; a binding information computing unit coupled to the packet processing unit, the binding information computing unit configured to assign an identifier to the communications device; a binding information managing unit coupled to the packet processing unit, the binding information managing unit configured to manage changes in the binding information; and an addressing unit coupled to the packet processing unit, the addressing unit configured to configure an addressing identifier for the communications device.

The method could further include, wherein packet processing unit determines if a communications device is attaching to the communications system by detecting messages exchanged between the communications device and a network entity in the communications system, wherein the messages are exchanged in an attachment process. The method could further include, wherein packet processing unit determines if a communications device is attaching to the communications system by detecting a transmission from the communications device to the proxy requesting attachment. The method could further include, wherein the binding information managing unit causes a transmission of the identifier and an addressing identifier to a server. The method could further include, wherein the addressing unit configures the addressing identifier based on configuration information received from a server.

Advantageous features of embodiments of the invention may include: a method for proxy operations, the method comprising: determining that a communications device is detaching from a communications system; updating binding information for the communications device at a server; and providing binding information for the communications device to neighboring proxies.

The method could further include, wherein determining that a communications device is detaching comprises detecting transmissions from the communications device, wherein the transmissions comprise messages exchanged in order for the communications device to detach from the communications system. The method could further include, wherein determining that a communications device is attaching comprises receiving an attach message from the communications device. The method could further include, wherein updating binding information comprises transmitting a request to remove binding information related to the communications device and the proxy from the server. The method could further include, wherein providing binding information comprises transmitting binding information related to the communications device to the neighboring proxies.

Advantageous features of embodiments of the invention may include: a proxy comprising: a packet processing unit configured to determine if a communications device is detaching from a communications system; and a binding information managing unit coupled to the packet processing unit, the binding information managing unit configured to manage changes in the binding information and to generate a binding information update for neighboring proxies.

The method could further include, wherein packet processing unit determines if a communications device is attaching to the communications system by detecting messages exchanged between the communications device and a network entity in the communications system, wherein the messages are exchanged in an attachment process. The method could further include, wherein packet processing unit determines if a communications device is attaching to the communications system by detecting a transmission from the communications device to the proxy requesting attachment. The method could further include, wherein the binding information managing unit causes a transmission of a request to removing binding information related to the communications device and to the proxy from a server. The method could further include, wherein the binding information managing unit causes a transmission of binding information related to the communications device to the neighboring proxies.

Advantageous features of embodiments of the invention may include: a method for proxy operations, the method comprising: determining that a communications device is attaching to a communications system, wherein the communications device was previously attached to the communications system through an alternate proxy; updating binding information for the communications device at a server; and configuring an addressing identifier for the communications device.

The method could further include, further comprising establishing a security association with the server for the communications device. The method could further include, wherein configuring an addressing identifier comprises: configuring the addressing identifier based on configuration information received from the server; and ensuring that the addressing identifier is unique. The method could further include, wherein the configuration information is received in a response from the server.

Advantageous features of embodiments of the invention may include: a proxy comprising: a packet processing unit configured to determine if a communications device is attaching to a communications system, wherein the communications device was previously attached to the communications system through an alternate proxy; a binding information managing unit coupled to the packet processing unit, the binding information managing unit configured to manage changes in the binding information; and an addressing unit coupled to the packet processing unit, the addressing unit configured to configure an addressing identifier for the communications device.

The method could further include, wherein the addressing unit is further configured to ensure that the addressing identifier is unique. The method could further include, further comprising a securing association creating unit coupled to the packet processing unit, the security association creating unit configured to establish a security association between the proxy and a server for the communications device.

Although the present invention and its advantages have been described in detail, it should be understood that various changes, substitutions and alterations can be made herein without departing from the spirit and scope of the invention as defined by the appended claims.

Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method for proxy server operations, the method comprising:
   determining that a communications device is attaching to a communications system;
   updating binding information with a binding information managing unit, wherein the binding information is for the communications device at a server, and wherein the binding information comprises a host identifier for the communications device;
   configuring an addressing identifier for the communications device using an addressing unit;
   determining if the communications device is host identity protocol (HIP) enabled or non-HIP enabled;
   when the communications device is HIP enabled, converting non-HIP packets sent to the communications device to HIP packets for forwarding to the communications device; and
   when the communications device is non-HIP enabled, converting non-HIP packets received from the communications device to HIP packets for forwarding to a correspondent device.

2. The method of claim 1, wherein the communications device was previously attached to the communications system through an alternative proxy server, and the method further comprises establishing a security association with the server for the communications device.

3. The method of claim 1, wherein configuring the addressing identifier comprises:
   configuring the addressing identifier based on configuration information received from the server; and
   ensuring that the addressing identifier is unique.

4. The method of claim 3, wherein the configuration information is received in a response from the server.

5. The method of claim 1, further comprising assigning the host identifier for the communications device.

6. The method of claim 5, wherein determining that the communications device is attaching comprises detecting transmissions from the communications device, wherein the transmissions comprise messages exchanged in order for the communications device to attach to the communications system.

7. The method of claim 5, wherein determining that the communications device is attaching comprises receiving an attach message from the communications device.

8. The method of claim 5, wherein the host identifier is used for identification of the communications device.

9. The method of claim 5, further comprising transmitting the addressing identifier for the communications device to the communications device.

10. The method of claim 5, wherein updating binding information comprises transmitting the host identifier for the communications device and an addressing identifier for the proxy server.

11. The method of claim 10, wherein the binding information is transmitted to the server.

12. The method of claim 1, further comprising receiving a response from the server, wherein the response comprises configuration information.

13. The method of claim 12, wherein configuring the addressing identifier for the communications device is based on the configuration information.

14. A proxy server comprising
   a packet processing unit configured to determine if a communications device is attaching to a communications system;
   a binding information managing unit coupled to the packet processing unit, the binding information managing unit configured to manage changes in the binding information;
   an addressing unit coupled to the packet processing unit, the addressing unit configured to configure an addressing identifier for the communications device;
   a packet translating unit coupled to the packet processing unit and configured to
      determine if the communications device is host identity protocol (HIP) enabled or non-HIP enabled;
      when the communications device is HIP enabled, convert non-HIP packets sent to the communications device to HIP packets for forwarding to the communications device; and
      when the communications device is non-HIP enabled, convert non-HIP packets received from the communications device to HIP packets for forwarding to a correspondent device.

15. The proxy server of claim 14, wherein the packet processing unit configured to determine if the communications device is attaching to the communications system comprises the packet processing unit configured to detect messages exchanged between the communications device and a network entity in the communications system, wherein the messages are exchanged in an attachment process.

16. The proxy server of claim 14, wherein the packet processing unit configured to determine if the communications device is attaching to the communications system comprises the packet processing unit configured to detect a transmission from the communications device to the proxy server requesting attachment.

17. The proxy server of claim 14, further comprising a binding information computing unit coupled to the packet processing unit, the binding information computing unit configured to assign a host identifier to the communications device.

18. The proxy server of claim 17, wherein the binding information managing unit is configured to cause a transmission of the host identifier and the addressing identifier to a server.

19. The proxy server of claim 14, wherein the addressing unit is configured to configure the addressing identifier based on configuration information received from a server.

20. The proxy server of claim 14, further comprising a security association unit configured to establish a security association with a server for the communications device when the communications device was previously attached to the communications system through an alternative proxy server.

21. The proxy server of claim 14, wherein the addressing unit configured to configure the addressing identifier further comprises the addressing unit configured to ensure that the addressing identifier is unique.

22. The proxy server of claim 17, wherein the packet processing unit is further configured to use the host identifier for identification of the communications device.

23. The proxy server of claim 14, wherein the binding information managing unit is further configured to cause transmission of the addressing identifier for the communications device to the communications device.

24. A method for proxy server operations, the method comprising:
    determining if a communications device attached to a communications system is host identity protocol (HIP) enabled or non-HIP enabled;
    when the communications device is HIP enabled, converting non-HIP packets sent to the communications device to HIP packets for forwarding to the communications device;
    when the communications device is non-HIP enabled, converting non-HIP packets received from the communications device to HIP packets for forwarding to a correspondent device;
    determining that the communications device is detaching from the communications system;
    updating binding information with a binding information managing unit, wherein the binding information is for the communications device at a server; and
    transmitting the binding information for the communications device to neighboring proxies.

25. The method of claim 24, wherein determining that the communications device is detaching comprises detecting transmissions from the communications device, wherein the transmissions comprise messages exchanged in order for the communications device to detach from the communications system.

26. The method of claim 24, wherein determining that the communications device is detaching comprises receiving a detach message from the communications device.

27. The method of claim 24, wherein updating binding information comprises transmitting a request to remove binding information related to the communications device and the proxy server from the server.

28. The method of claim 24, wherein transmitting binding information comprises transmitting binding information related to the communications device to the neighboring proxies.

29. A proxy server comprising:
    a processor configured to
        determine if a communications device attached to a communications system is host identity protocol (HIP) enabled or non-HIP enabled;
        when the communications device is HIP enabled, convert non-HIP packets sent to the communications device to HIP packets for forwarding to the communications device;
        when the communications device is non-HIP enabled, convert non-HIP packets received from the communications device to HIP packets for forwarding to a correspondent device; and
        determine that the communications device is detaching from the communications system; and
        update binding information for the communications device at a server; and
    a transmitter coupled to the processor, and configured to transmit the binding information for the communications device to neighboring proxies.

30. The proxy server of claim 29, wherein the processor configured to determine that the communications device is detaching comprises the processor configured to detect transmissions from the communications device, wherein the transmissions comprise messages exchanged in order for the communications device to detach from the communications system.

31. The proxy server of claim 29, wherein the processor configured to determine that the communications device is detaching comprises the processor configured to receive a detach message from the communications device.

32. The proxy server of claim 29, wherein the processor configured to update the binding information comprises the processor configured to cause the transmitter to transmit a request to remove the binding information related to the communications device and the proxy server from the server.

33. The proxy server of claim 29, wherein the transmitter configured to transmit the binding information comprises the transmitter configured to transmit the binding information related to the communications device to the neighboring proxies.

* * * * *